US012659109B2

(12) United States Patent
Rodriguez Fernandez et al.

(10) Patent No.: US 12,659,109 B2
(45) Date of Patent: Jun. 16, 2026

(54) SYSTEMS AND TECHNIQUES FOR SECURE SOUNDING REFERENCE SIGNAL COMMUNICATION

(71) Applicant: QUALCOMM Incorporated, San Diego, CA (US)

(72) Inventors: Javier Rodriguez Fernandez, San Diego, CA (US); Alberto Rico Alvarino, San Diego, CA (US); Kazuki Takeda, Minato-ku (JP); Le Liu, San Jose, CA (US); Xiao Feng Wang, San Diego, CA (US); Umesh Phuyal, San Diego, CA (US); Peter Gaal, San Diego, CA (US); Juan Montojo, San Diego, CA (US); Edward George Tiedemann, Jr., Concord, MA (US)

(73) Assignee: QUALCOMM Incorporated, San Diego, CA (US)

( * ) Notice: Subject to any disclaimer, the term of this patent is extended or adjusted under 35 U.S.C. 154(b) by 850 days.

(21) Appl. No.: 18/051,814

(22) Filed: Nov. 1, 2022

(65) Prior Publication Data

US 2024/0146477 A1 May 2, 2024

(51) Int. Cl.
| | |
|---|---|
| *H04L 12/26* | (2006.01) |
| *H04L 5/00* | (2006.01) |
| *H04W 12/069* | (2021.01) |

(52) U.S. Cl.
CPC ......... *H04L 5/0051* (2013.01); *H04W 12/069* (2021.01)

(58) Field of Classification Search
None
See application file for complete search history.

(56) References Cited

U.S. PATENT DOCUMENTS

2021/0105040 A1     4/2021    Manolakos et al.

FOREIGN PATENT DOCUMENTS

| | | | | |
|---|---|---|---|---|
| WO | WO-2016118765 A1 * | 7/2016 | ............ | H04W 8/005 |
| WO | WO-2021155505 A1 | 8/2021 | | |
| WO | WO-2023161242 A1 * | 8/2023 | ............ | H04W 24/10 |

OTHER PUBLICATIONS

International Search Report and Written Opinion—PCT/US2023/034205—ISA/EPO—Jan. 30, 2024.

* cited by examiner

*Primary Examiner* — Zewdu A Beyen
(74) *Attorney, Agent, or Firm* — Holland & Hart LLP

(57) ABSTRACT

Methods, systems, and devices for wireless communications are described. A user equipment (UE) and a network entity may pseudo-randomly generate frequency hopping indexes to support secure communication of sounding reference signals (SRSs). For example, the UE may securely obtain a key associated with communication a set of SRSs via respective portions of system bandwidth for communicating with the network entity. The UE and the network entity may generate a set of frequency hopping indexes using the key. The set of frequency hopping indexes may correspond to the set of SRSs, and each frequency hopping index may indicate a respective portion of the system bandwidth for communication of a corresponding SRS. The UE and the network entity may communicate the set of SRSs in accordance with the set of frequency hopping indexes.

28 Claims, 20 Drawing Sheets

| | | |
|---|---|---|
| 225 | ▨ | Key Message |
| 230 | ▨ | SRS |
| 235 | ▨ | Control Message |
| 240 | ▨ | Index Message |

Key <u>510</u>

Input <u>515-a</u>

Input <u>515-n</u>

Function <u>505</u>

Bit Vector(s) <u>520</u>

500

130

105

115

Network
Entity

Transceiver

1410

Antenna

1415

Communications
Manager

Memory

Code

1430

1425

1420

1440

Processor

1435

1405

1400

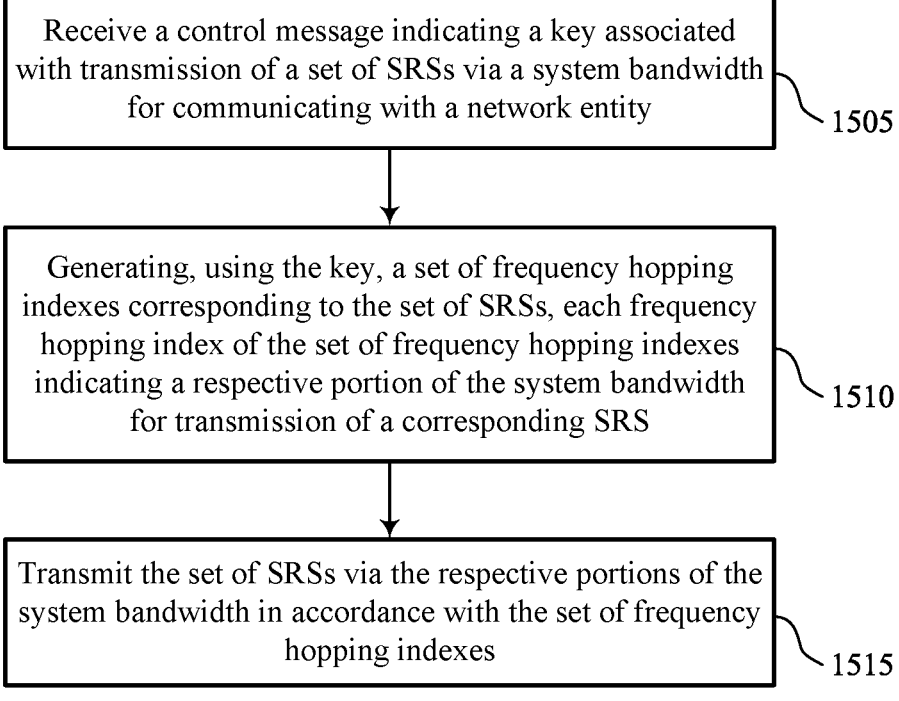

Receive a control message indicating a key associated with transmission of a set of SRSs via a system bandwidth for communicating with a network entity

1505

Generating, using the key, a set of frequency hopping indexes corresponding to the set of SRSs, each frequency hopping index of the set of frequency hopping indexes indicating a respective portion of the system bandwidth for transmission of a corresponding SRS

1510

Transmit the set of SRSs via the respective portions of the system bandwidth in accordance with the set of frequency hopping indexes

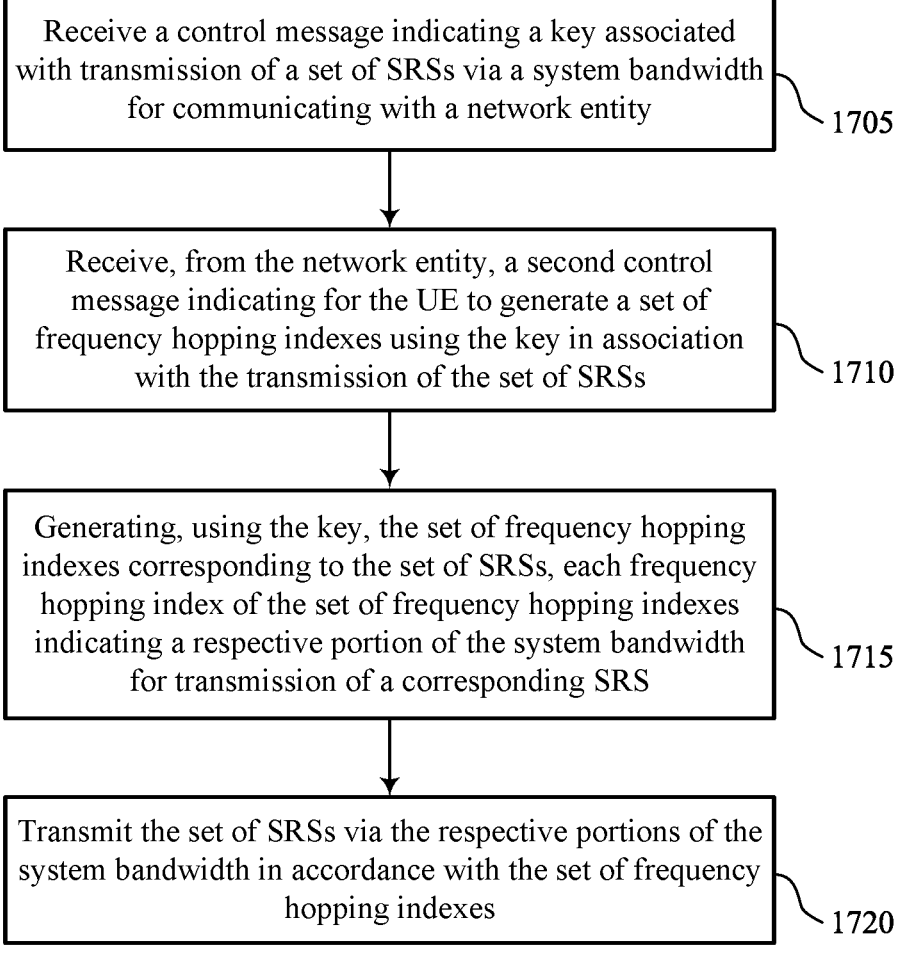

Receive a control message indicating a key associated with transmission of a set of SRSs via a system bandwidth for communicating with a network entity
1705

Receive, from the network entity, a second control message indicating for the UE to generate a set of frequency hopping indexes using the key in association with the transmission of the set of SRSs
1710

Generating, using the key, the set of frequency hopping indexes corresponding to the set of SRSs, each frequency hopping index of the set of frequency hopping indexes indicating a respective portion of the system bandwidth for transmission of a corresponding SRS
1715

Transmit the set of SRSs via the respective portions of the system bandwidth in accordance with the set of frequency hopping indexes
1720

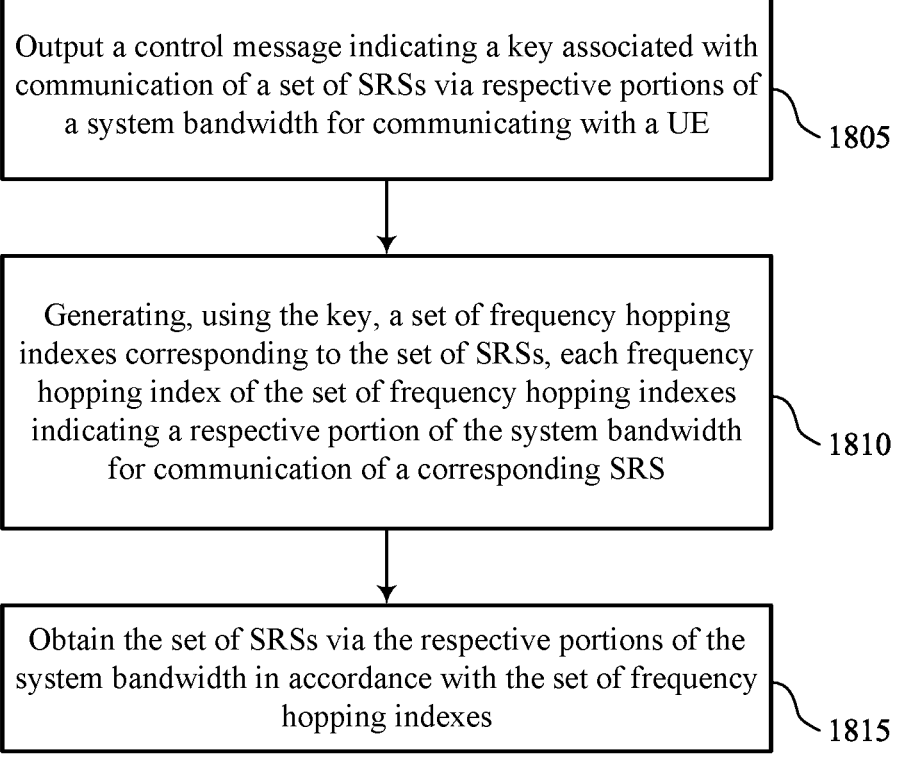

Output a control message indicating a key associated with communication of a set of SRSs via respective portions of a system bandwidth for communicating with a UE

1805

Generating, using the key, a set of frequency hopping indexes corresponding to the set of SRSs, each frequency hopping index of the set of frequency hopping indexes indicating a respective portion of the system bandwidth for communication of a corresponding SRS

1810

Obtain the set of SRSs via the respective portions of the system bandwidth in accordance with the set of frequency hopping indexes

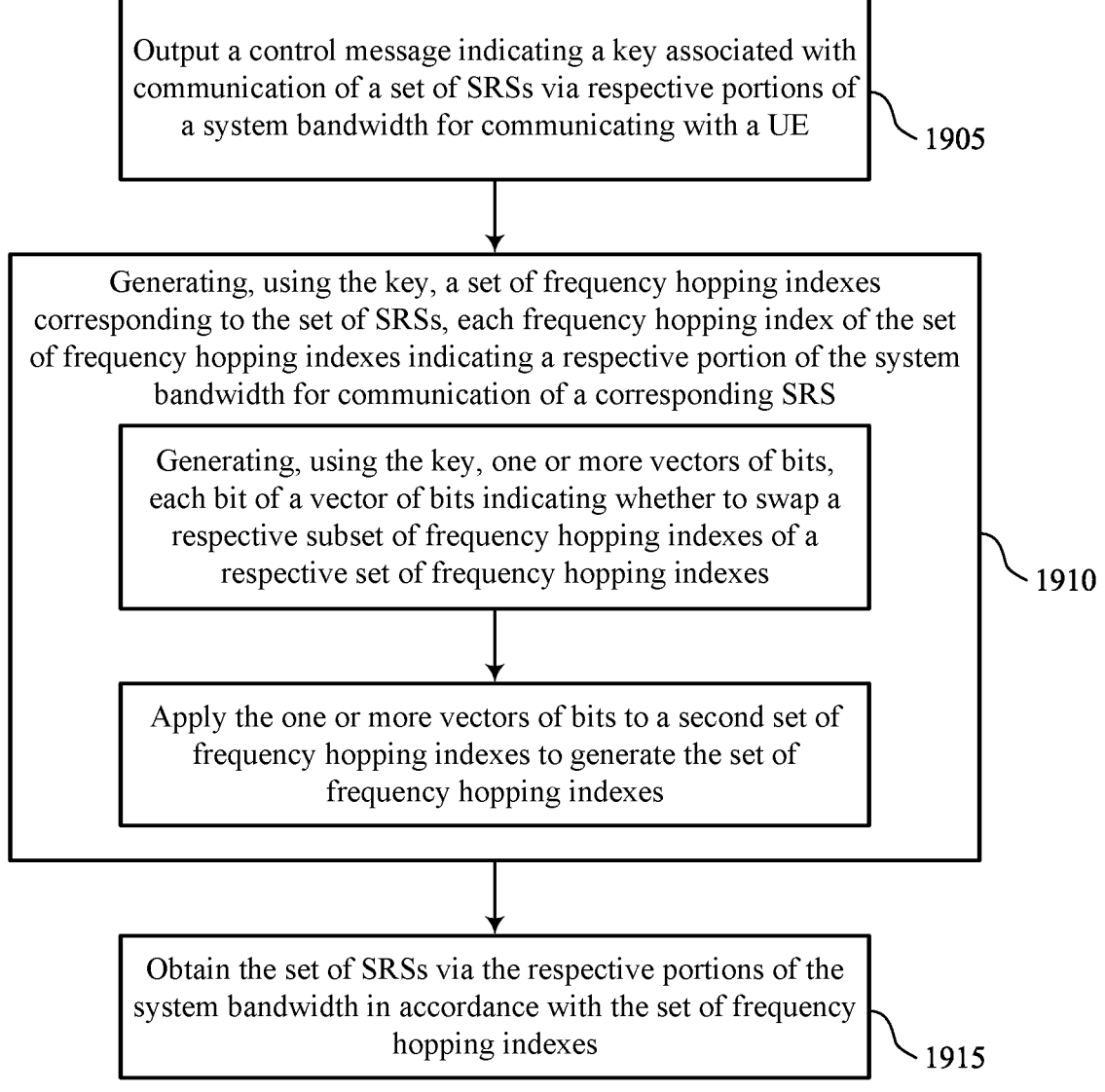

Output a control message indicating a key associated with communication of a set of SRSs via respective portions of a system bandwidth for communicating with a UE ⟍ 1905

Generating, using the key, a set of frequency hopping indexes corresponding to the set of SRSs, each frequency hopping index of the set of frequency hopping indexes indicating a respective portion of the system bandwidth for communication of a corresponding SRS Generating, using the key, one or more vectors of bits, each bit of a vector of bits indicating whether to swap a respective subset of frequency hopping indexes of a respective set of frequency hopping indexes

⟍ 1910

Apply the one or more vectors of bits to a second set of frequency hopping indexes to generate the set of frequency hopping indexes Obtain the set of SRSs via the respective portions of the system bandwidth in accordance with the set of frequency hopping indexes ⟍ 1915

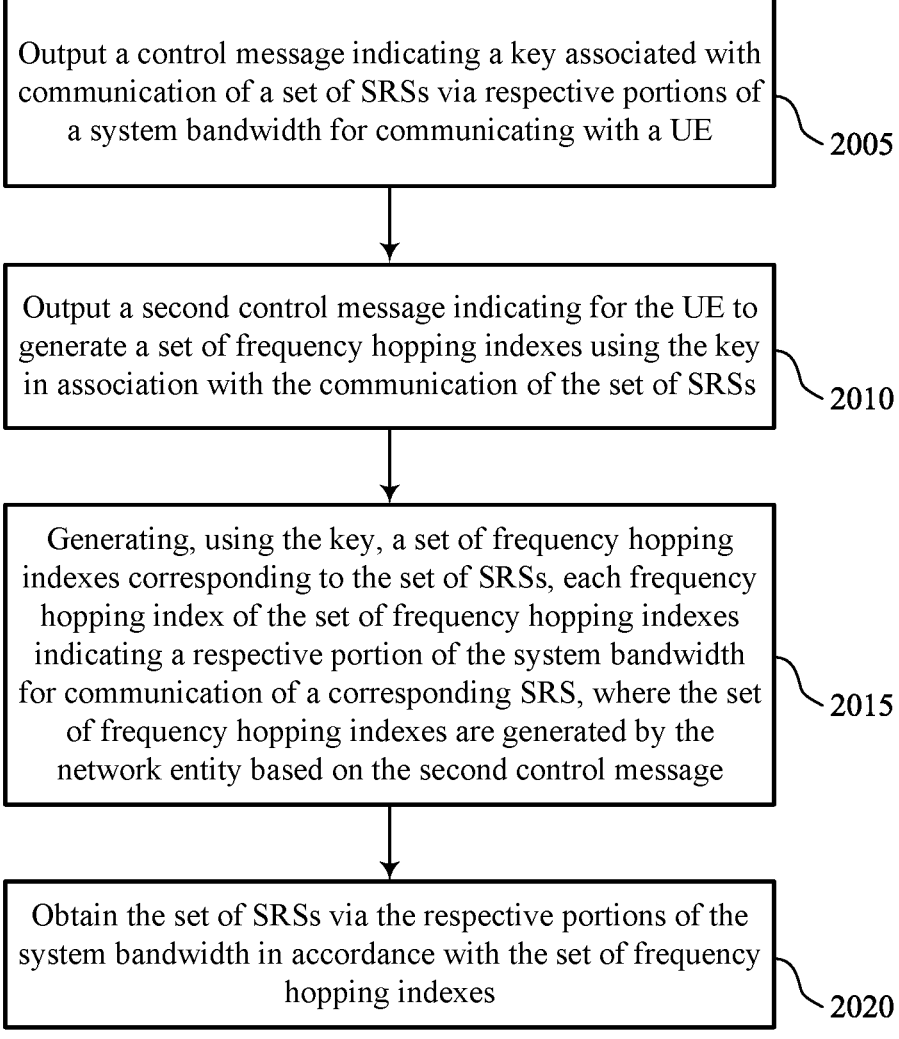

Output a control message indicating a key associated with communication of a set of SRSs via respective portions of a system bandwidth for communicating with a UE

2005

Output a second control message indicating for the UE to generate a set of frequency hopping indexes using the key in association with the communication of the set of SRSs

2010

Generating, using the key, a set of frequency hopping indexes corresponding to the set of SRSs, each frequency hopping index of the set of frequency hopping indexes indicating a respective portion of the system bandwidth for communication of a corresponding SRS, where the set of frequency hopping indexes are generated by the network entity based on the second control message

2015

Obtain the set of SRSs via the respective portions of the system bandwidth in accordance with the set of frequency hopping indexes

SYSTEMS AND TECHNIQUES FOR SECURE SOUNDING REFERENCE SIGNAL COMMUNICATION

FIELD OF TECHNOLOGY

The following relates to wireless communications, including systems and techniques for secure sounding reference signal (SRS) communication.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may be configured to transmit sounding reference signals (SRSs), for example, to enable a network entity to obtain channel information. In some examples, the UE may transmit SRSs to the network entity in accordance with frequency hopping indexes, which may be completely deterministic. As such, communication of SRSs may be subject to security threats and attacks.

SUMMARY

The described techniques relate to improved methods, systems, devices, and apparatuses that support systems and techniques for secure sounding reference signal (SRS) communication. For example, the described techniques provide for the secure generation of frequency hopping indexes according to which SRSs may be communicated. For instance, a user equipment (UE) and a network entity may communicate via a system bandwidth, and the UE may transmit SRSs via respective portions of the system bandwidth to the network entity. The SRSs may be communicated in accordance with frequency hopping indexes that each indicate a respective portion of the system bandwidth for transmission of a corresponding SRS. To securely determine the frequency hopping indexes, the UE and the network entity may use a key (e.g., a secret key, a secure key) to generate (e.g., pseudo-randomly) the frequency hopping indexes. Because the UE and the network entity may use the same key, the frequency hopping indexes generated by the UE and the network entity may be the same. However, devices to which the key is unknown may be unable to generate the frequency hopping indexes, and the frequency hopping performed by the UE to transmit SRSs in accordance with the frequency hopping indexes may appear random to such devices, which may improve security.

Accordingly, the UE and the network entity may securely communicate the SRSs in accordance with the securely generated frequency hopping indexes.

A method for wireless communication at a UE is described. The method may include receiving a control message indicating a key associated with transmission of a set of SRSs via a system bandwidth for communicating with a network entity, generating, using the key, a set of frequency hopping indexes corresponding to the set of SRSs, each frequency hopping index of the set of frequency hopping indexes indicating a respective portion of the system bandwidth for transmission of a corresponding SRS, and transmitting the set of SRSs via the respective portions of the system bandwidth in accordance with the set of frequency hopping indexes.

An apparatus for wireless communication at a UE is described. The apparatus may include a processor, memory coupled with the processor, and instructions stored in the memory. The instructions may be executable by the processor to cause the apparatus to receive a control message indicating a key associated with transmission of a set of SRSs via a system bandwidth for communicating with a network entity, generating, used the key, a set of frequency hopping indexes corresponding to the set of SRSs, each frequency hopping index of the set of frequency hopping indexes indicating a respective portion of the system bandwidth for transmission of a corresponding SRS, and transmit the set of SRSs via the respective portions of the system bandwidth in accordance with the set of frequency hopping indexes.

Another apparatus for wireless communication at a UE is described. The apparatus may include means for receiving a control message indicating a key associated with transmission of a set of SRSs via a system bandwidth for communicating with a network entity, means for generating, using the key, a set of frequency hopping indexes corresponding to the set of SRSs, each frequency hopping index of the set of frequency hopping indexes indicating a respective portion of the system bandwidth for transmission of a corresponding SRS, and means for transmitting the set of SRSs via the respective portions of the system bandwidth in accordance with the set of frequency hopping indexes.

A non-transitory computer-readable medium storing code for wireless communication at a UE is described. The code may include instructions executable by a processor to receive a control message indicating a key associated with transmission of a set of SRSs via a system bandwidth for communicating with a network entity, generating, used the key, a set of frequency hopping indexes corresponding to the set of SRSs, each frequency hopping index of the set of frequency hopping indexes indicating a respective portion of the system bandwidth for transmission of a corresponding SRS, and transmit the set of SRSs via the respective portions of the system bandwidth in accordance with the set of frequency hopping indexes.

In some examples of the method, apparatuses, and non-transitory computer-readable medium described herein, receiving the control message indicating the key may include operations, features, means, or instructions for receiving a binary sequence encrypted via an encryption key shared by the UE and the network entity and decrypting the binary sequence using the encryption key, where the binary sequence may be the key.

In some examples of the method, apparatuses, and non-transitory computer-readable medium described herein, receiving the control message indicating the key may include operations, features, means, or instructions for receiving one or more encryption keys based on a secure registration of the UE to a network, each encryption key of the one or more encryption keys corresponding to a respective cell, where the key may be an encryption key corresponding to a cell via which the UE and the network entity communicate.

In some examples of the method, apparatuses, and non-transitory computer-readable medium described herein, receiving the control message indicating the key may include operations, features, means, or instructions for receiving the control message based on an authentication of the UE within a group of UEs associated with a cell via which the UE and the network entity communicate, where the key may be common to the group of UEs.

In some examples of the method, apparatuses, and non-transitory computer-readable medium described herein, the control message indicating the key may be received from a second UE of the group of UEs based on the authentication of the UE within the group of UEs.

In some examples of the method, apparatuses, and non-transitory computer-readable medium described herein, generating the set of frequency hopping indexes may include operations, features, means, or instructions for generating, using the key, one or more vectors of bits, each bit of a vector of bits indicating whether to swap a respective subset of frequency hopping indexes of a respective set of frequency hopping indexes and applying the one or more vectors of bits to a second set of frequency hopping indexes to generate the set of frequency hopping indexes.

Some examples of the method, apparatuses, and non-transitory computer-readable medium described herein may further include operations, features, means, or instructions for determining the second set of frequency hopping indexes based on a orthogonal variable spreading factor (OVSF) code, where the one or more vectors of bits may be applied to the second set of frequency hopping indexes based on the determination.

Some examples of the method, apparatuses, and non-transitory computer-readable medium described herein may further include operations, features, means, or instructions for determining the respective subset of frequency hopping indexes to which a bit of the vector of bits corresponds based on a third set of frequency hopping indexes generated using the key.

In some examples of the method, apparatuses, and non-transitory computer-readable medium described herein, generating the one or more vectors of bits may include operations, features, means, or instructions for inputting the key and one or more additional inputs into a pseudo-random function that outputs the one or more vectors of bits, the one or more additional inputs including a cell identifier (ID) of a cell via which the UE and the network entity communicate, a time, a seed received from the network entity, or a combination thereof.

Some examples of the method, apparatuses, and non-transitory computer-readable medium described herein may further include operations, features, means, or instructions for receiving, from the network entity, a second control message indicating for the UE to generate the set of frequency hopping indexes using the key in association with the transmission of the set of SRSs.

Some examples of the method, apparatuses, and non-transitory computer-readable medium described herein may further include operations, features, means, or instructions for generating, using the key or a second key received from the network entity, a mapping between a set of slot offsets and a set of indexes corresponding to the set of slot offsets, each slot offset of the set of slot offsets indicating an offset from an initial slot of a transmission time interval (TTI) associated with transmission of a respective SRS and receiving, from the network entity, a second control message indicating a first index of the set of indexes corresponding to a first slot offset of the set of slot offsets based on the mapping, where at least a subset of the set of SRSs may be transmitted via respective TTIs in accordance with the first slot offset.

Some examples of the method, apparatuses, and non-transitory computer-readable medium described herein may further include operations, features, means, or instructions for generating, using the key or the second key, a second mapping between the set of slot offsets and the set of indexes, where the second mapping may be different than the mapping and receiving, from the network entity a third control message indicating a second index of the set of indexes corresponding to a second slot offset of the set of slot offsets based on the second mapping, where a second subset of the set of SRSs may be transmitted via respective TTIs in accordance with the second slot offset.

Some examples of the method, apparatuses, and non-transitory computer-readable medium described herein may further include operations, features, means, or instructions for receiving, from the network entity, a third control message indicating for the UE to generate the mapping using the key or the second key in association with the transmission of the set of SRSs.

Some examples of the method, apparatuses, and non-transitory computer-readable medium described herein may further include operations, features, means, or instructions for generating, using the key or a second key received from the network entity, a mapping between a set of periodicities associated with the transmission of the set of SRSs and a set of indexes corresponding to the set of periodicities and receiving, from the network entity, a second control message indicating a first index of the set of indexes corresponding to a first periodicity of the set of periodicities based on the mapping, where at least a subset of the set of SRSs may be transmitted via respective TTIs in accordance with the first periodicity.

Some examples of the method, apparatuses, and non-transitory computer-readable medium described herein may further include operations, features, means, or instructions for generating, using the key or the second key, a second mapping between the set of periodicities and the set of indexes, where the second mapping may be different than the mapping and receiving, from the network entity a third control message indicating a second index of the set of indexes corresponding to a second periodicity of the set of periodicities based on the second mapping, where a second subset of the set of SRSs may be transmitted via respective TTIs in accordance with the second periodicity.

Some examples of the method, apparatuses, and non-transitory computer-readable medium described herein may further include operations, features, means, or instructions for receiving, from the network entity, a third control message indicating for the UE to generate the mapping using the key or the second key in association with the transmission of the set of SRSs.

In some examples of the method, apparatuses, and non-transitory computer-readable medium described herein, the key may be common to a cell via which the UE and the network entity communicate or common to a respective group of UEs associated with the cell that includes the UE.

A method for wireless communication at a network entity is described. The method may include outputting a control message indicating a key associated with communication of a set of SRSs via respective portions of a system bandwidth for communicating with a UE, generating, using the key, a set of frequency hopping indexes corresponding to the set of SRSs, each frequency hopping index of the set of frequency hopping indexes indicating a respective portion of the system bandwidth for communication of a corresponding SRS, and obtaining the set of SRSs via the respective portions of the system bandwidth in accordance with the set of frequency hopping indexes.

An apparatus for wireless communication at a network entity is described. The apparatus may include a processor, memory coupled with the processor, and instructions stored in the memory. The instructions may be executable by the processor to cause the apparatus to output a control message indicating a key associated with communication of a set of SRSs via respective portions of a system bandwidth for communicating with a UE, generating, used the key, a set of frequency hopping indexes corresponding to the set of SRSs, each frequency hopping index of the set of frequency hopping indexes indicating a respective portion of the system bandwidth for communication of a corresponding SRS, and obtain the set of SRSs via the respective portions of the system bandwidth in accordance with the set of frequency hopping indexes.

Another apparatus for wireless communication at a network entity is described. The apparatus may include means for outputting a control message indicating a key associated with communication of a set of SRSs via respective portions of a system bandwidth for communicating with a UE, means for generating, using the key, a set of frequency hopping indexes corresponding to the set of SRSs, each frequency hopping index of the set of frequency hopping indexes indicating a respective portion of the system bandwidth for communication of a corresponding SRS, and means for obtaining the set of SRSs via the respective portions of the system bandwidth in accordance with the set of frequency hopping indexes.

A non-transitory computer-readable medium storing code for wireless communication at a network entity is described. The code may include instructions executable by a processor to output a control message indicating a key associated with communication of a set of SRSs via respective portions of a system bandwidth for communicating with a UE, generating, used the key, a set of frequency hopping indexes corresponding to the set of SRSs, each frequency hopping index of the set of frequency hopping indexes indicating a respective portion of the system bandwidth for communication of a corresponding SRS, and obtain the set of SRSs via the respective portions of the system bandwidth in accordance with the set of frequency hopping indexes.

In some examples of the method, apparatuses, and non-transitory computer-readable medium described herein, outputting the control message indicating the key may include operations, features, means, or instructions for outputting a binary sequence encrypted via an encryption key shared by the UE and the network entity, where the binary sequence may be the key.

In some examples of the method, apparatuses, and non-transitory computer-readable medium described herein, outputting the control message indicating the key may include operations, features, means, or instructions for outputting one or more encryption keys based on a secure registration of the UE with the network entity, each encryption key of the one or more encryption keys corresponding to a respective cell, where the key may be an encryption key corresponding to a cell via which the UE and the network entity communicate.

In some examples of the method, apparatuses, and non-transitory computer-readable medium described herein, outputting the control message indicating the key may include operations, features, means, or instructions for outputting the control message based on an authentication of the UE within a group of UEs associated with a cell via which the UE and the network entity communicate, where the key may be common to the group of UEs.

In some examples of the method, apparatuses, and non-transitory computer-readable medium described herein, generating the set of frequency hopping indexes may include operations, features, means, or instructions for generating, using the key, one or more vectors of bits, each bit of a vector of bits indicating whether to swap a respective subset of frequency hopping indexes of a respective set of frequency hopping indexes and applying the one or more vectors of bits to a second set of frequency hopping indexes to generate the set of frequency hopping indexes.

Some examples of the method, apparatuses, and non-transitory computer-readable medium described herein may further include operations, features, means, or instructions for determining the second set of frequency hopping indexes based on an OVSF code, where the one or more vectors of bits may be applied to the second set of frequency hopping indexes based on the determination.

Some examples of the method, apparatuses, and non-transitory computer-readable medium described herein may further include operations, features, means, or instructions for determining the respective subset of frequency hopping indexes to which a bit of the vector of bits corresponds based on a third set of frequency hopping indexes generated using the key.

In some examples of the method, apparatuses, and non-transitory computer-readable medium described herein, generating the one or more vectors of bits may include operations, features, means, or instructions for inputting the key and one or more additional inputs into a pseudo-random function that outputs the one or more vectors of bits, the one or more additional inputs including a cell ID of a cell via which the UE and the network entity communicate, a time, a seed generated by the network entity, or a combination thereof.

Some examples of the method, apparatuses, and non-transitory computer-readable medium described herein may further include operations, features, means, or instructions for outputting a second control message indicating for the UE to generate the set of frequency hopping indexes using the key in association with the communication of the set of SRSs, where the set of frequency hopping indexes may be generated by the network entity based on the second control message.

Some examples of the method, apparatuses, and non-transitory computer-readable medium described herein may further include operations, features, means, or instructions for generating, using the key or a second key, a mapping between a set of slot offsets and a set of indexes corresponding to the set of slot offsets, each slot offset of the set of slot offsets indicating an offset from an initial slot of a TTI associated with communication of a respective SRS and outputting a second control message indicating a first index of the set of indexes corresponding to a first slot offset of the set of slot offsets based on the mapping, where at least a subset of the set of SRSs may be obtained via respective TTIs in accordance with the first slot offset.

Some examples of the method, apparatuses, and non-transitory computer-readable medium described herein may further include operations, features, means, or instructions for generating, using the key or the second key, a second mapping between the set of slot offsets and the set of indexes, where the second mapping may be different than the mapping and outputting a third control message indicating a second index of the set of indexes corresponding to a second slot offset of the set of slot offsets based on the second mapping, where a second subset of the set of SRSs may be obtained via respective TTIs in accordance with the second slot offset.

Some examples of the method, apparatuses, and non-transitory computer-readable medium described herein may further include operations, features, means, or instructions for outputting a third control message indicating for the UE to generate the mapping using the key or the second key in association with the communication of the set of SRSs, where the mapping may be generated by the network entity based on the third control message.

Some examples of the method, apparatuses, and non-transitory computer-readable medium described herein may further include operations, features, means, or instructions for generating, using the key or a second key, a mapping between a set of periodicities associated with the communication of the set of SRSs and a set of indexes corresponding to the set of periodicities and outputting a second control message indicating a first index of the set of indexes corresponding to a first periodicity of the set of periodicities based on the mapping, where at least a subset of the set of SRSs may be obtained via respective TTIs in accordance with the first periodicity.

Some examples of the method, apparatuses, and non-transitory computer-readable medium described herein may further include operations, features, means, or instructions for generating, using the key or the second key, a second mapping between the set of periodicities and the set of indexes, where the second mapping may be different than the mapping and outputting a third control message indicating a second index of the set of indexes corresponding to a second periodicity of the set of periodicities based on the second mapping, where a second subset of the set of SRSs may be obtained via respective TTIs in accordance with the second periodicity.

Some examples of the method, apparatuses, and non-transitory computer-readable medium described herein may further include operations, features, means, or instructions for outputting a third control message indicating for the UE to generate the mapping using the key or the second key in association with the communication of the set of SRSs, where the mapping may be generated by the network entity based on the third control message.

In some examples of the method, apparatuses, and non-transitory computer-readable medium described herein, the key may be common to a cell via which the UE and the network entity communicate or common to a respective group of UEs associated with the cell that includes the UE.

8

Figure 3:
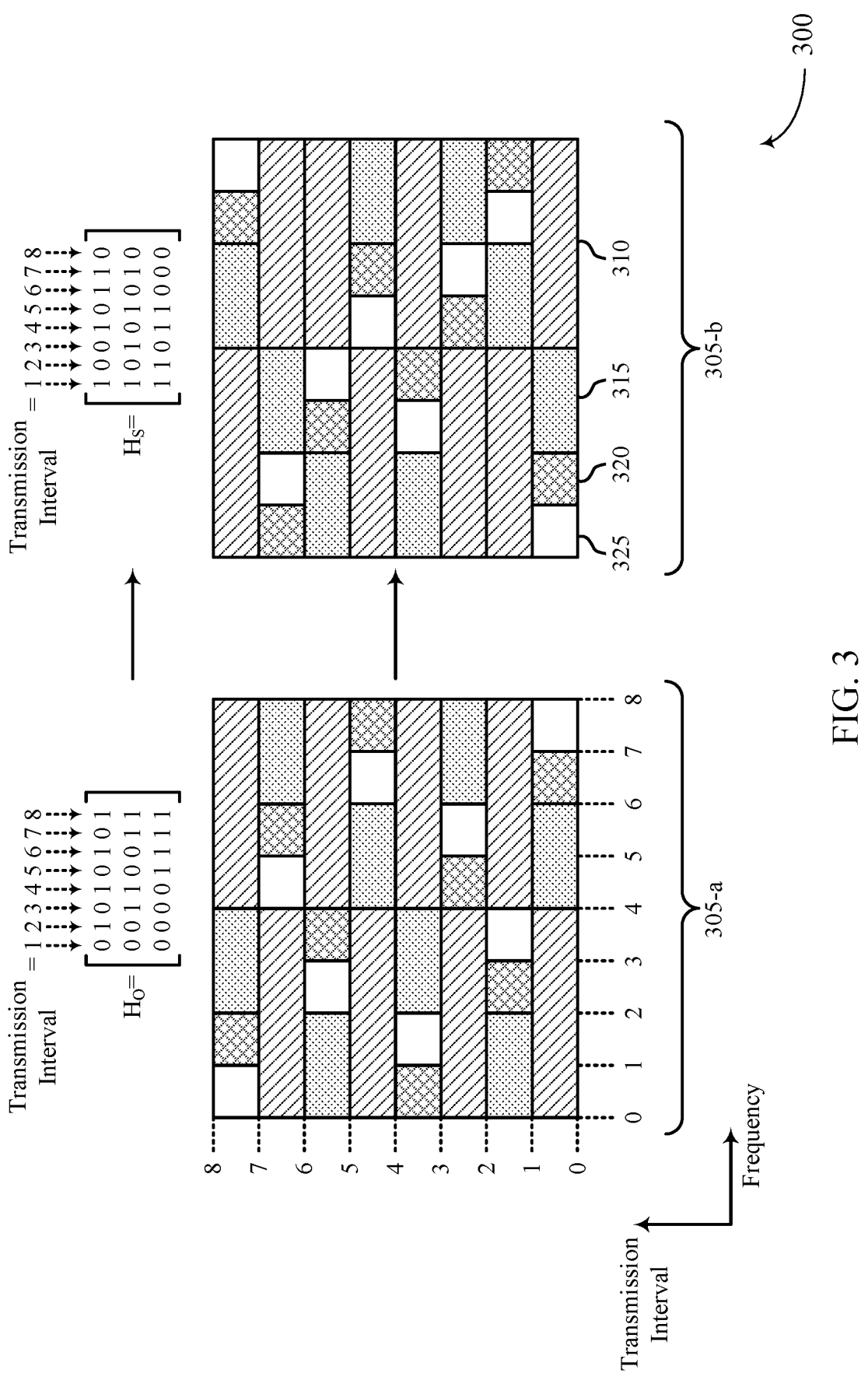

FIG. 3 illustrates an example of a hopping diagram that supports systems and techniques for secure SRS communication in accordance with one or more aspects of the present disclosure.

Figure 4:
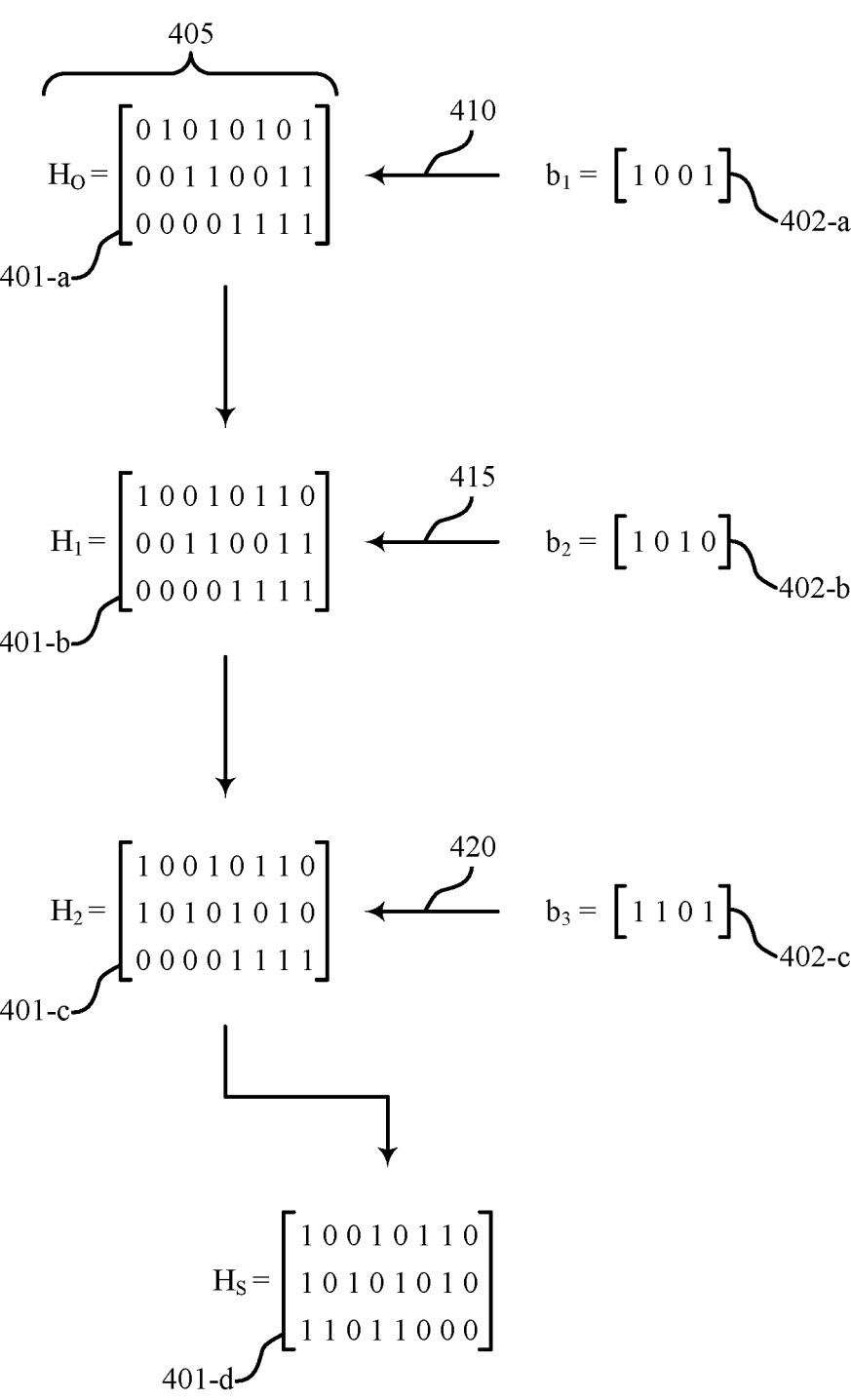

FIG. 4 illustrates an example of a process flow that supports systems and techniques for secure SRS communication in accordance with one or more aspects of the present disclosure.

Figure 5:
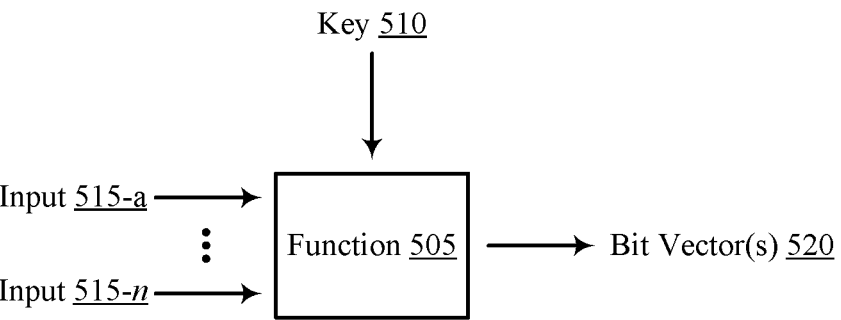

FIG. 5 illustrates an example of a bit generation diagram that supports systems and techniques for secure SRS communication in accordance with one or more aspects of the present disclosure.

Figure 6:
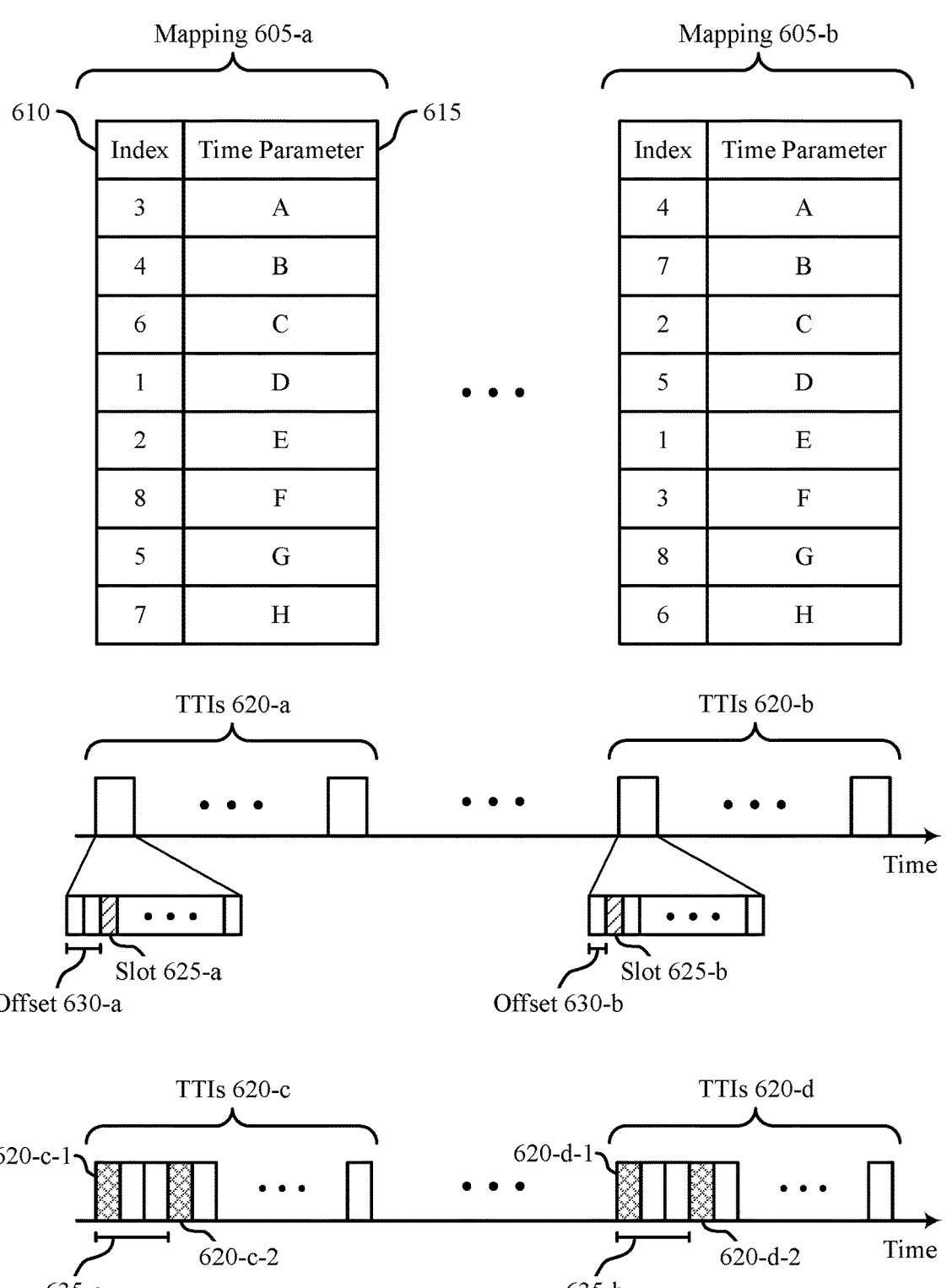

FIG. 6 illustrates an example of a communication diagram that supports systems and techniques for secure SRS communication in accordance with one or more aspects of the present disclosure.

Figure 7:
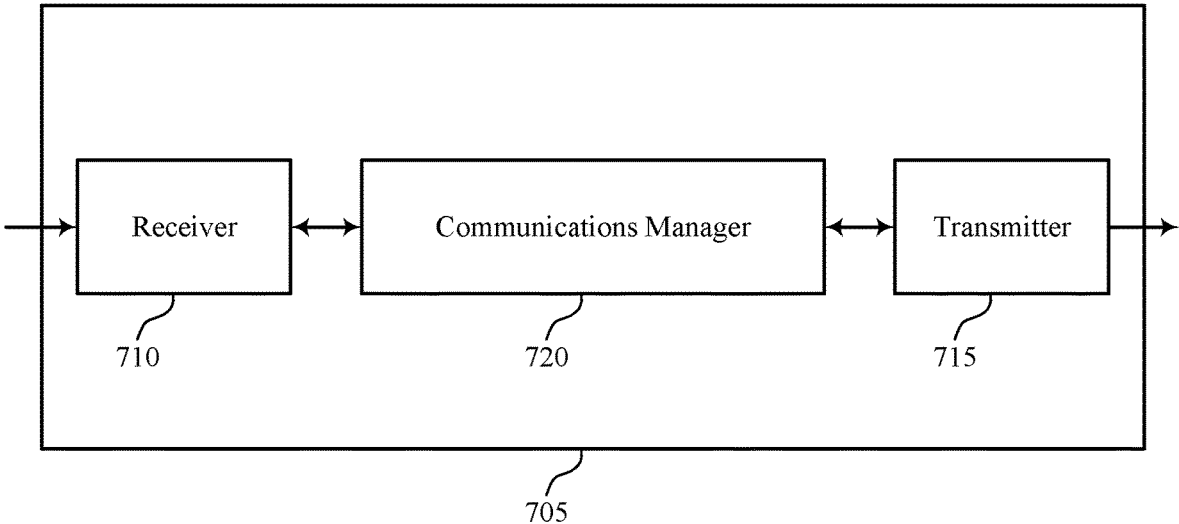
Figure 8:
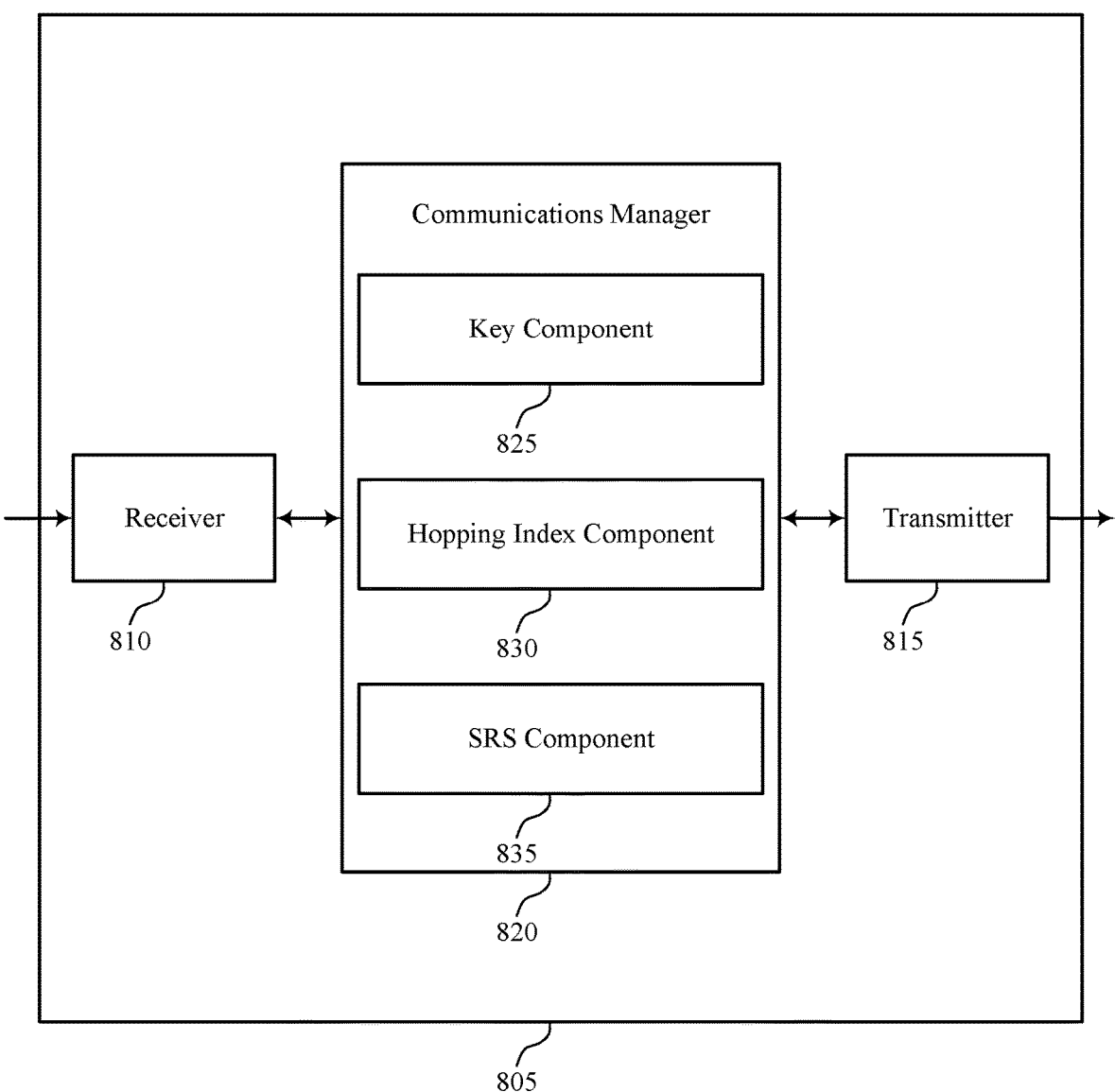

FIGS. 7 and 8 illustrate block diagrams of devices that support systems and techniques for secure SRS communication in accordance with one or more aspects of the present disclosure.

Figure 9:
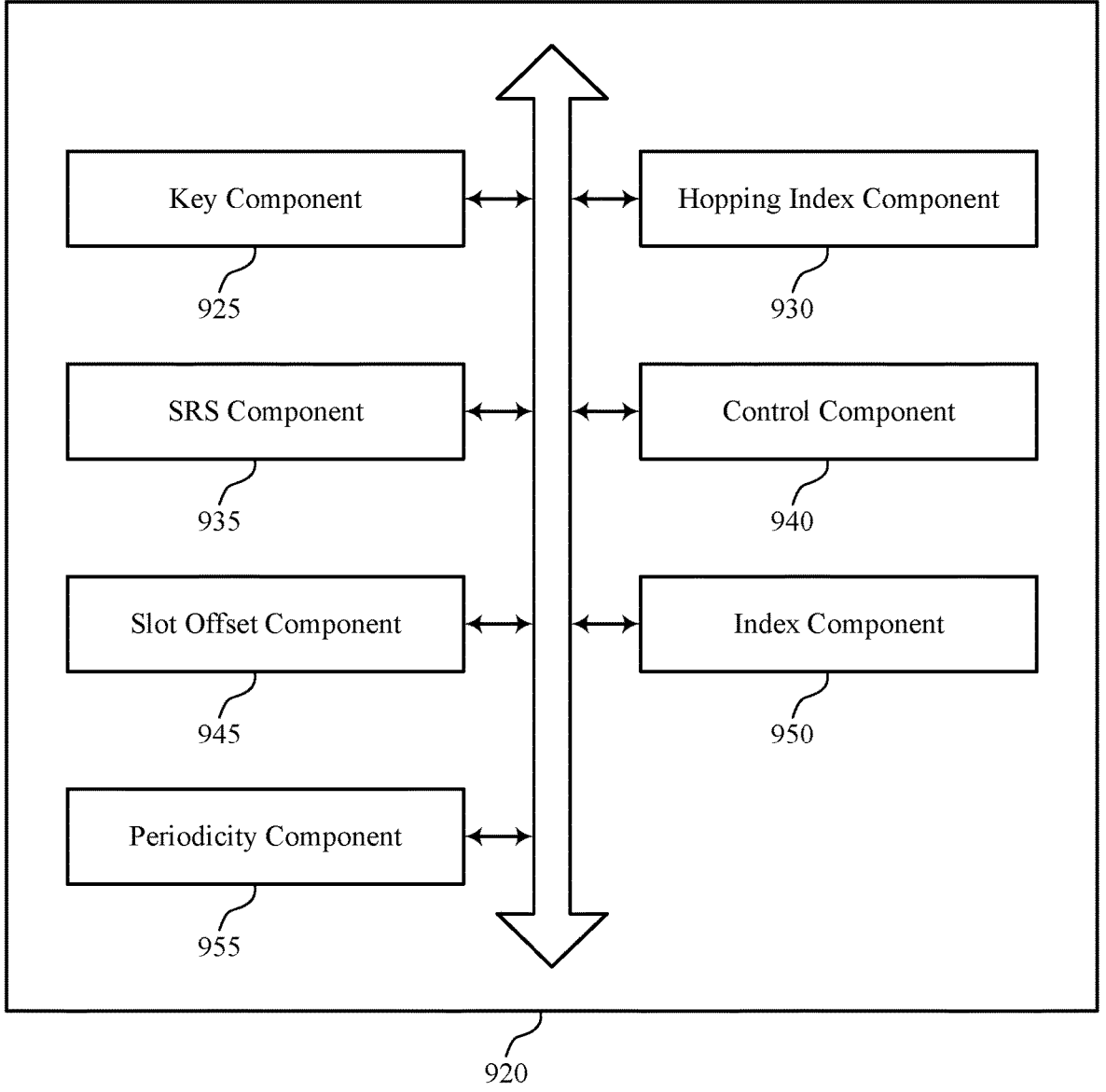

FIG. 9 illustrates a block diagram of a communications manager that supports systems and techniques for secure SRS communication in accordance with one or more aspects of the present disclosure.

Figure 10:
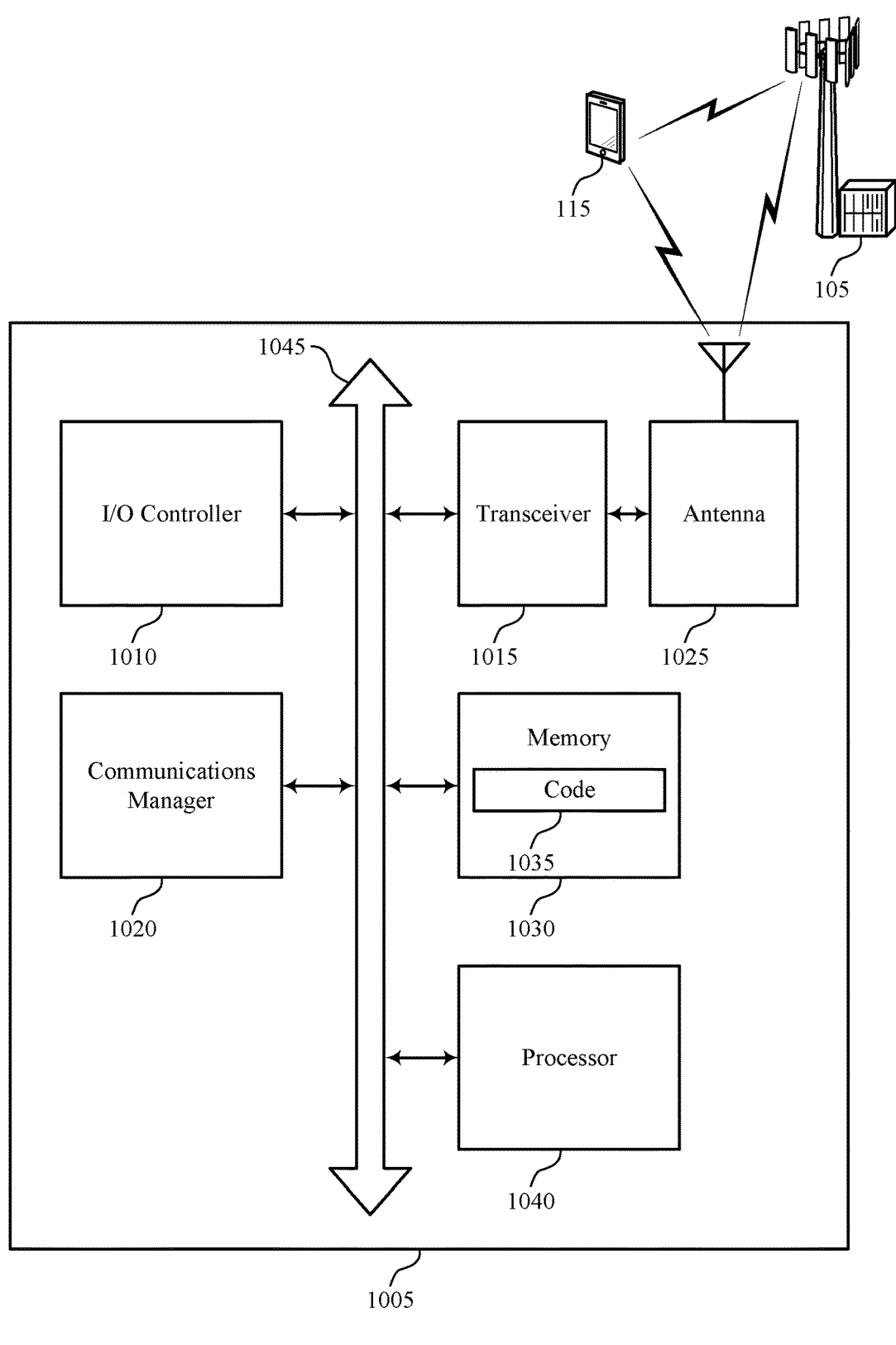

FIG. 10 illustrates a diagram of a system including a device that supports systems and techniques for secure SRS communication in accordance with one or more aspects of the present disclosure.

Figure 11:
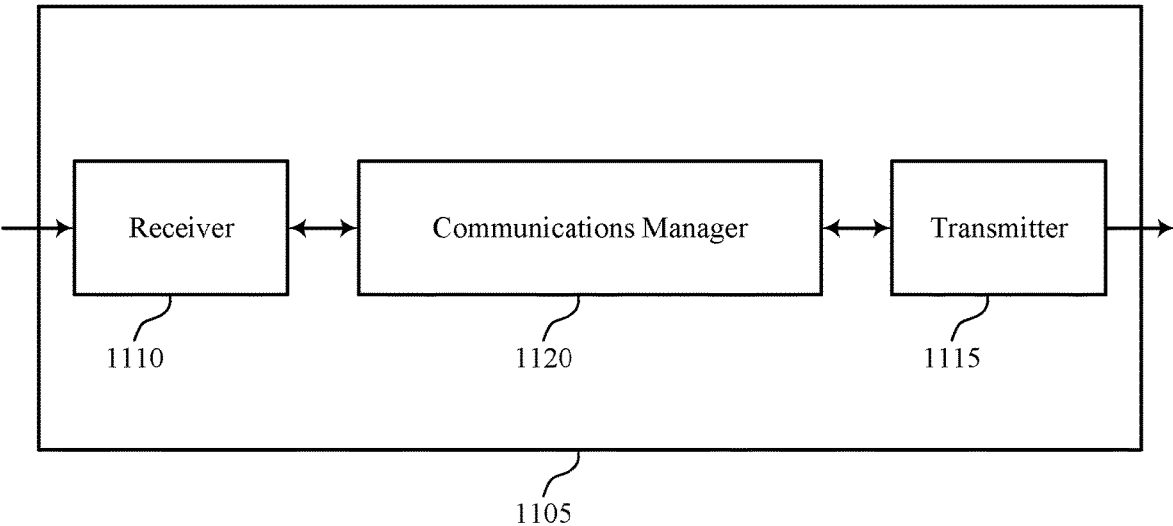
Figure 12:
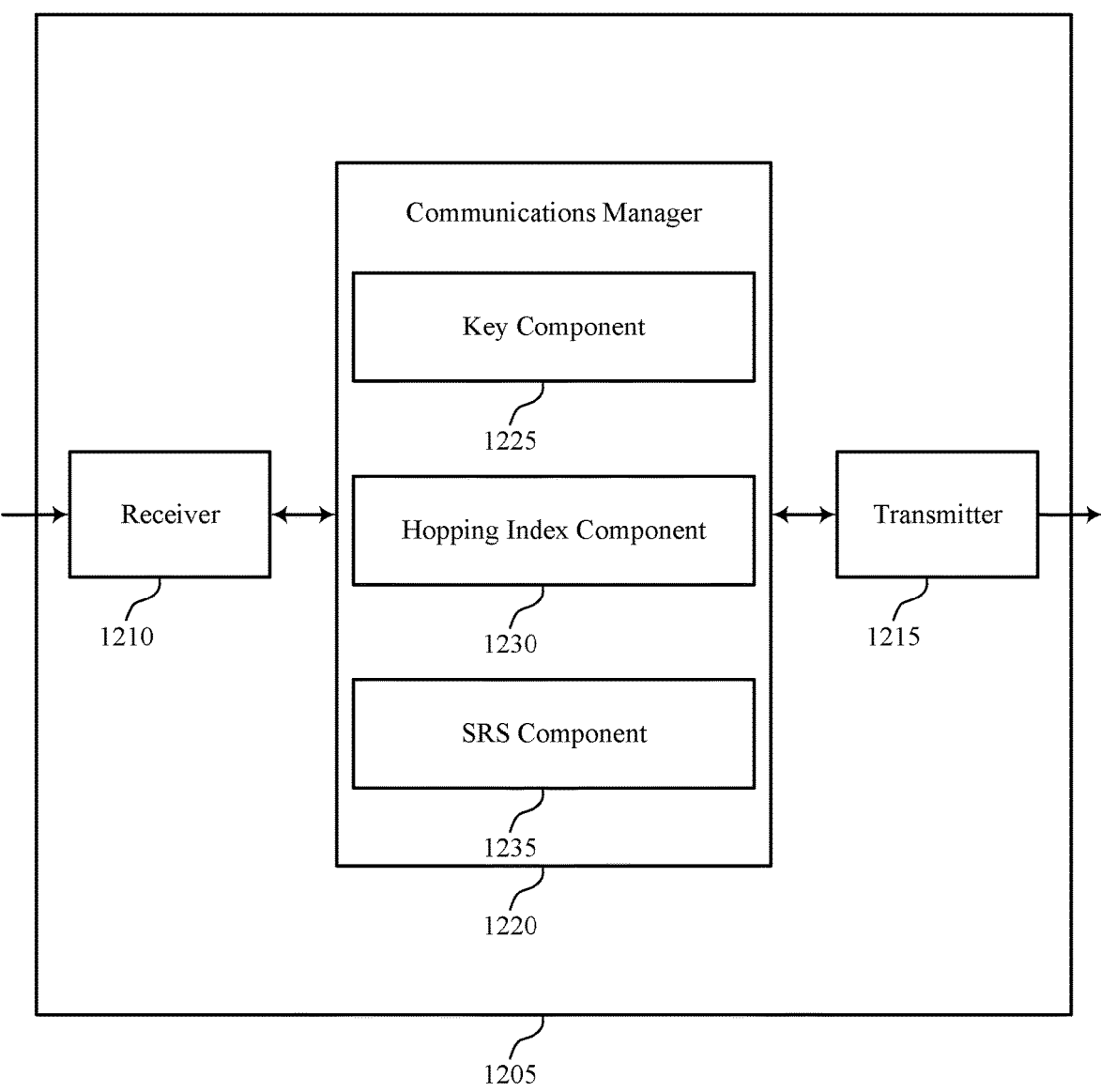

FIGS. 11 and 12 illustrate block diagrams of devices that support systems and techniques for secure SRS communication in accordance with one or more aspects of the present disclosure.

Figure 13:
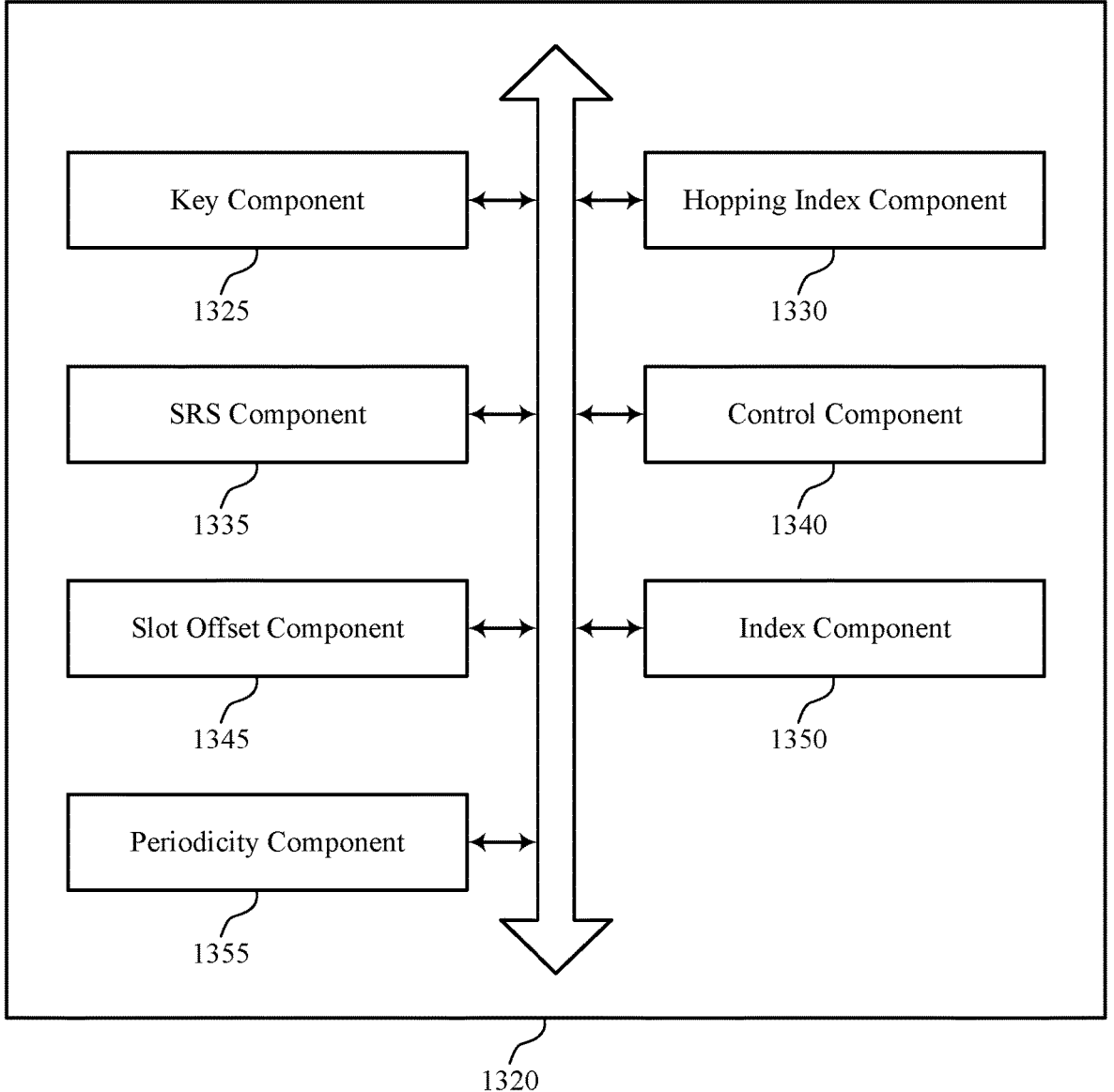

FIG. 13 illustrates a block diagram of a communications manager that supports systems and techniques for secure SRS communication in accordance with one or more aspects of the present disclosure.

Figure 14:

FIG. 14 illustrates a diagram of a system including a device that supports systems and techniques for secure SRS communication in accordance with one or more aspects of the present disclosure.

FIGS. 15 through 20 illustrate flowcharts showing methods that support systems and techniques for secure SRS communication in accordance with one or more aspects of the present disclosure.

DETAILED DESCRIPTION

In some wireless communications systems, a user equipment (UE) may transmit a sounding reference signal (SRS) to a network entity to enable the network entity to perform channel measurements on the SRS and obtain (e.g., estimate) channel information, such as a channel quality of an uplink channel via which the UE transmits the SRS. In some examples, the network entity may use the channel information to support resource scheduling and allocation, beam management, transmission power management, or downlink channel estimation (e.g., due to channel reciprocity), among other operations. The UE may transmit one or more SRS such that the network entity may obtain channel information for an entirety of a given bandwidth (e.g., a system bandwidth via which the UE and the network entity communicate). For example, the UE may transmit an SRS via a wide bandwidth that spans the system bandwidth (e.g., a bandwidth spanning a frequency range above a threshold range or portion of the system bandwidth). Alternatively, if a configured bandwidth of an SRS is less than a threshold portion of the system bandwidth, the UE may transmit multiple SRSs via respective portions of the system bandwidth that together span the system bandwidth. In other words, the UE may perform frequency hopping between different portions of the system bandwidth in transmitting SRSs to the network entity such that the network entity may obtain channel information for the system bandwidth (e.g., to enable scanning of the entire desired bandwidth, such as the system bandwidth).

The UE may hop between bandwidth portions in accordance with a set of frequency hopping indexes. For example, each frequency hopping index may indicate a respective portion of the system bandwidth for communication of a corresponding SRS. In some cases, however, frequency hopping may be completely deterministic (e.g., and repetitive) based on an orthogonal variable spreading factor (OVSF) code (e.g., an OVSF code tree). That is, frequency hopping performed by the UE to transmits SRSs may be completely determined by any device using the OVSF code, including a malicious actor. As a result, SRSs transmitted in accordance with deterministic frequency hopping indexes may be subject to some security threats. For example, the malicious actor may jam a bandwidth via which an SRS is communicated to prevent the network entity from obtaining the channel information, which may cause denial of service. Additionally or alternatively, the malicious actor may extract (e.g., estimate, determine) some channel information, such as a channel quality indicator (CQI) or pathloss information, to determine whether the UE is nearby or far, among other security threats.

Techniques, systems, and devices are described herein to support secure SRS communication. For example, a UE and a network entity may introduce security into SRS frequency hopping by securely generating a set of frequency hopping indexes according to which the UE and the network entity may communicate a set of SRSs. To securely generate the set of frequency hopping indexes, the UE and the network entity may pseudo-randomly generate the set of frequency hopping indexes using a key (e.g., a secure key, a secret key). Because the UE and the network entity may use the same key, the set of frequency hopping indexes generated by the UE and the network entity may be the same. However, the key may be securely obtained by the UE and the network entity, and devices (e.g., including malicious actors) that are unable to obtain the key may be unable to generate the frequency hopping indexes. As a result, the frequency hopping performed by the UE to transmit SRSs in accordance with the set of frequency hopping indexes may appear random to such devices, which improves security of transmission of the SRSs. Accordingly, the UE and the network entity may securely communicate the SRSs in accordance with the securely generated set of frequency hopping indexes.

Communicating SRSs in accordance with pseudo-randomly generated frequency hopping indexes may reduce the likelihood that a malicious actor successfully determines a frequency hopping pattern for communication of the SRSs. As a result, the likelihood of successful security attacks, such as denial of service or information extraction, may be reduced, thereby increasing a reliability of the SRSs and an accuracy of the channel information obtained the network entity, among other benefits.

Aspects of the disclosure are initially described in the context of wireless communications systems. Aspects of the disclosure are additionally described in the context of a hopping diagram, a bit generation diagram, process flows, and a communication diagram. Aspects of the disclosure are further illustrated by and described with reference to apparatus diagrams, system diagrams, and flowcharts that relate to systems and techniques for secure SRS communication.

Figure 1:
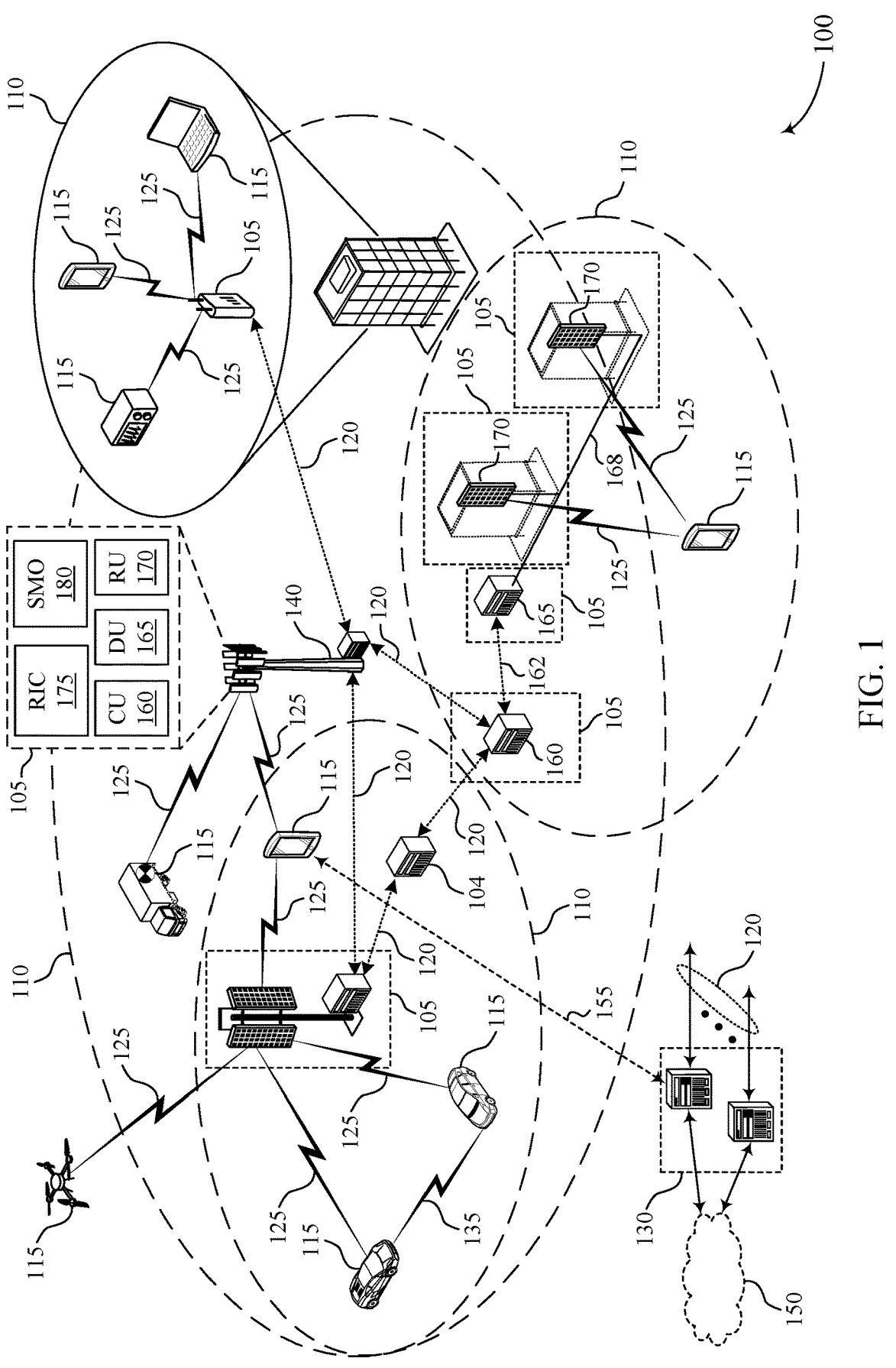
FIGS. 1 and 2 illustrate examples of wireless communications systems that supports systems and techniques for secure sounding reference signal (SRS) communication in accordance with one or more aspects of the present disclosure.

FIG. 1 illustrates an example of a wireless communications system 100 that supports systems and techniques for secure SRS communication in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115)

within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support systems and techniques for secure SRS communication as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., N f) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier (ID) for distinguishing neighboring cells (e.g., a physical cell ID (PCID), a virtual cell ID (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications.

The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

A UE 115 may transmit an SRS (e.g., using a predetermined sequence, such as a Zadoff-Chu sequence), for example, to enable a network entity 105 to estimate uplink channel quality. An SRS transmission may not be associated with transmission of data on another channel. In some examples, an SRS may be transmitted periodically on a wide bandwidth (e.g., a bandwidth including more subcarriers than are allocated for uplink data transmission). In some examples, an SRS may be scheduled on multiple antenna ports and still be considered a single SRS transmission. An SRS transmission may be categorized as a Type 0 (periodically transmitted at equally spaced intervals) SRS or as a Type 1 (aperiodic) SRS. The network entity 105 may control the timing of SRS transmissions by notifying the UE 115 of which TTIs (e.g., subframes, slots) may support the transmission of the SRS. Information gathered by the network entity 105 from an SRS may be used to inform the scheduling of uplink transmissions by the UE 115, such as frequency dependent transmissions. The network entity 105 may also utilize an SRS to check timing alignment status and send time alignment commands to the UE 115.

In some examples, a configured bandwidth via which an SRS is transmitted may be less than a desired bandwidth that a network entity 105 wants to measure and obtain channel information (e.g., a system bandwidth via which the network entity 105 communicates with a UE 115). The UE 115 may be configured to perform frequency hopping in which multiple SRSs are transmitted via respective portions of the desired bandwidth such that the bandwidths of the multiple SRSs may together span the desired bandwidth.

In accordance with examples described herein, a UE 115 may securely perform frequency hopping in association with transmitting SRSs to a network entity 105. For example, the UE 115 may transmit a given SRS via a portion of the bandwidth indicated by a corresponding frequency hopping index. The network entity 105 may also know the frequency hopping index and may thus determine the portion of the bandwidth via which to receive (e.g., obtain) the SRS. To support secure frequency hopping, the UE 115 and the network entity 105 may securely generate a set of frequency hopping indexes according to which the UE 115 and the network entity 105 may communicate a set of SRSs. The UE 115 and the network entity 105 may generate the set of frequency hopping indexes using a key known the network entity 105 and the UE 115 such that a frequency hopping pattern corresponding to the set of frequency hopping indexes may appear random to devices to which the key is unknown. Thus, the UE 115 and the network entity 105 may securely communicate the SRSs in accordance with the set of frequency hopping indexes.

Figure 2:
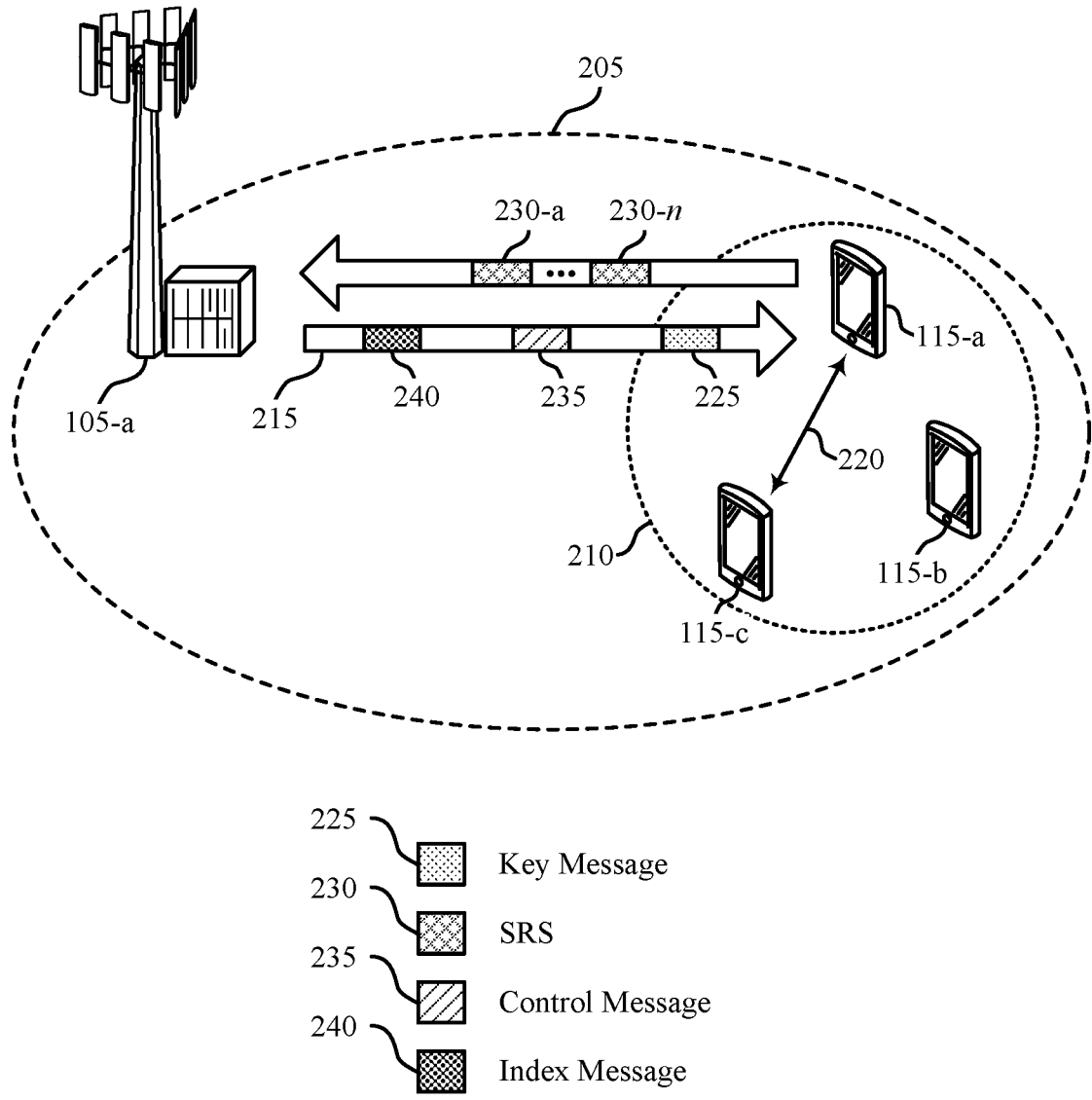

FIG. 2 illustrates an example of a wireless communications system 200 that supports systems and techniques for secure SRS communication in accordance with one or more aspects of the present disclosure. The wireless communications system 200 may implement or be implemented by aspects of wireless communications system 100 as described with reference to FIG. 1. For example, the wireless communications system 200 may include a network entity 105-*a* and one or more UEs 115 (e.g., a UE 115-*a*, a UE 115-*b*, and a UE 115-*c*), which may be examples of the corresponding devices described herein, including with reference to FIG. 1.

The wireless communications system 200 may support communication between the UEs 115 and the network entity 105-*a*. For example, the network entity 105-*a* and the UEs 115 may communicate via respective communications links 215. The communications links 215 may be examples of a communication link 125 described with reference to FIG. 1. The wireless communications system 200 may also support communication between the UEs 115, for example, via a communication link 220, which may be an example of a D2D communication link 135 described with reference to FIG. 1.

The network entity 105-*a* may support a coverage area 205 over which the UEs 115 and the network entity 105-*a* may communicate, which may be an example of a coverage area 110 described with reference to FIG. 1. In some examples, the coverage area 205 may be associated with a cell for which the network entity 105-*a* provides coverage. For example, the coverage area 205 may correspond to a geographic area covered by the cell.

The network entity 105-*a* and the one or more UEs 115 may communicate via a system bandwidth that spans some range of frequencies. The one or more UEs 115 may transmit SRSs 230 to the network entity 105-*a* based on which the network entity 105-*a* may obtain channel information. To support scanning the entire system bandwidth (e.g., obtaining channel information associated with the entire system bandwidth), the one or more UEs 115 may perform frequency hopping between SRS transmissions to transmit multiple SRSs 230 via respective portions of the system bandwidth that together span the system bandwidth.

The one or more UEs 115 may perform frequency hopping in accordance with a frequency hopping pattern. For example, the one or more UEs 115 may generate a set of frequency hopping indexes that each correspond to a respective SRS transmission. That is, each frequency hopping index may indicate a respective portion of the system bandwidth via which a UE 115 is to transmit a corresponding SRS 230.

To improve the security of the communication of SRSs 230, a UE 115 and the network entity 105-*a* may securely generate a set of frequency hopping indexes according to which the UE 115 and the network entity 105-*a* are to communicate the SRSs 230. For example, the UE 115-*a* may obtain a key (e.g., a secure key, a secret key) that is also known to (e.g., determined or obtained by) the network entity 105-*a*. The UE 115-*a* and the network entity 105-*a* may use the key to generate (e.g., pseudo-randomly) the set of frequency hopping indexes. For example, the UE 115-*a* and the network entity 105-*a* may use the key as an input into a pseudo-random function that may output a set of frequency hopping indexes or may output other information used to generate the set of frequency hopping indexes. Additional details related to the generation of the set of frequency hopping indexes using the key are described with reference to FIGS. 3 through 5 below. Additional details related to the use of a pseudo-random function as part of the generation of the set of frequency hopping indexes are described with reference to FIGS. 4 and 5 below.

The UE 115-*a* may transmit a set of SRSs 230 to the network entity 105-*a* in accordance with the set of frequency hopping indexes. For example, the UE 115-*a* may transmit an SRS 230-*a* through an SRS 230-*n* via respective portions of the system bandwidth in accordance with the set of frequency hopping indexes, each SRS 230 corresponding to a frequency hopping index of the set of frequency hopping indexes. In some examples, the bandwidths of the SRS 230-*a* through the SRS 230-*n* may together span the system bandwidth. In some examples, the bandwidths of the SRS 230-*a* through the SRS 230-*n* may together span the system bandwidth multiple times. For example, a first subset of the SRSs 230 may together span the system bandwidth a first time, a second subset of the SRSs 230 may together span the system bandwidth a second time, and so on.

The key may be securely obtained by the UE 115-*a* such that authorized devices (e.g., the network entity 105-*a*, the UEs 115-*a*, 115-*b*, and 115-*c*) are able to generate the set of frequency hopping indexes (e.g., and one or more other sets frequency hopping indexes), while unauthorized devices (e.g., a malicious actor) are unable to generate the set of frequency hopping indexes. For example, the network entity 105-*a* may transmit a key message 225 to the UE 115-*a* that indicates (e.g., includes) the key (e.g., via an encrypted message or a secure link between the UE 115-*a* and the network entity 105-*a*). In some examples, the key message 225 may include a binary sequence that is encrypted via an encryption key (e.g., a secret) shared by the UE 115-*a* and the network entity 105-*a*. For example, the network entity 105-*a* and the UE 115-*a* may communicate the encryption key prior to the communication of the key message 225, and the encryption key may be used to encrypt and decrypt various signaling communicated between the network entity 105-*a* and the UE 115-*a*. The network entity 105-*a* may encrypt the key message 225 using the encryption key (e.g., an Advanced Encryption Standard (AES) encryption of the binary sequence using the encryption key). Here, the binary sequence may be the key, and the UE 115-*a* may decrypt the binary sequence using the encryption key to determine (e.g., obtain) the key.

In some examples, key message 225 may include one or more encryption keys that are cell-specific keys that each correspond to a respective cell. For example, in response to (e.g., as part of) a secure registration of the UE 115-*a* to a network (e.g., a core network 130), the network entity 105-*a* may transmit the one or more encryption keys for use in encrypting and decrypting signaling communicated between the UE 115-*a* and the network via respective cells. In some examples, the key may correspond to an encryption key of the one or more encryption keys that corresponds to the cell supported by the network entity 105-*a*. That is, the key may be the cell-specific encryption key corresponding to the cell via which the UE 115-*a* and the network entity 105-*a* communicate. In some examples, the UE 115-*a* and the network entity 105-*a* may determine (e.g., identify, select) the cell-specific encryption key based on a cell ID of the cell.

In some examples, the UE 115-*a* may obtain the key based on an authentication of the UE 115-*a* within a group 210 of UEs 115. For example, within the cell supported by the network entity 105-*a*, there may be one or more groups 210 of UEs 115. In the example of FIG. 2, the UE 115-*a* may authenticate within a group 210 that includes the UE 115-*b* and the UE 115-*c*. Based on authenticating within the group

210, the UE 115-*a* may receive the key message 225 that includes a key (e.g., an encryption key) that is common to the group 210 (e.g., shared by the UEs 115 of the group 210). In some examples, the UE 115-*a* may receive the key message 225 including the common key from the network entity 105-*a*. In some examples, the UE 115-*a* may receive the key message 225 that includes the common key from another UE 115 (e.g., the UE 115-*c*) via a communication link 220. In some cases, the key used to generate the set of frequency hopping indexes may be the common key.

In some examples, the network entity 105-*a* may indicate whether the UE 115-*a* is to generate the set of frequency hopping indexes using the key or, for example, in accordance with a deterministic OVSF code. For example, the network entity 105-*a* may transmit a control message 235 that indicates for the UE 115-*a* to generate the set of frequency hopping indexes using the key. In some examples, the control message 235 may activate the generation of the set of frequency hopping indexes using the key in accordance with SRS communications. In some cases, another control message 235 may deactivate the generation of the set of frequency hopping indexes using the key.

The network entity 105-*a* and the one or more UEs 115 may support increased SRS communication security with respect to the time domain. For example, the network entity 105-*a* may indicate a slot offset according to which the UE 115-*a* is to transmit an SRS 230. For instance, the slot offset may indicate a slot of a TTI (e.g., subframe) via which the UE 115-*a* is to transmit the SRS 230 by indicating an offset from an initial slot of the TTI. Additionally or alternatively, the network entity 105-*a* may indicate a periodicity according to which the UE 115-*a* is to transmit SRSs 230 (e.g., the SRSs 230-*a* through 230-*n*). To indicate the slot offset or the periodicity, the network entity 105-*a* may transmit an index message 240 that indicates an index corresponding to a particular slot offset or periodicity. To introduce communication security with respect to the time domain, the UE 115-*a* and the network entity 105-*a* may use the key (e.g., or a second key) to pseudo-randomly generate a mapping between indexes and corresponding slot offsets or periodicities. In some examples, the network entity 105-*a* may transmit a control message 235 that indicates for the UE 115-*a* to generate the mapping using the key (e.g., activates or deactivates the generation of the mapping using the key). Additional details related to secure SRS communication with respect to the time domain are described with reference to FIGS. 6 and 7 below.

In some examples, the key may be used to generate frequency hopping indexes for a first period of time (e.g., a quantity of subframes, a quantity of slots). In some examples, a new key may be obtained by the UE 115-*a* after the first period of time that may be used for a second period of time, for example as part of a refresh process that occurs based on an expiration of the first period of time (e.g., after or in response to the first period of time ending).

FIG. 3 illustrates an example of a hopping diagram 300 that supports systems and techniques for secure SRS communication in accordance with one or more aspects of the present disclosure. The hopping diagram 300 may be implemented by aspects of the wireless communications systems 100 or 200 described with reference to FIGS. 1 and 2. For example, the hopping diagram 300 may by implemented by one or more UEs 115 and a network entity 105, which may be examples of the corresponding devices described herein, including with reference to FIGS. 1 and 2, to support the communication of SRSs in accordance with securely generated frequency hopping indexes.

The hopping diagram 300 may include a hopping pattern 305-*a* and a hopping pattern 305-*b*. The hopping patterns 305 may correspond to overarching hopping patterns according to which UEs 115 may transmit SRSs to the network entity 105. For example, in some cases, multiple UEs 115 may concurrently transmit respective SRSs via respective portions of a system bandwidth such that the network entity 105 may concurrently obtain respective channel information associated with each UE 115. To support concurrent SRS transmissions by multiple UEs 115, frequency hopping indexes may be generated such that there are no collisions between the concurrently transmitted SRSs. That is, the frequency hopping indexes may be generated to avoid overlap in the respective bandwidths of concurrently transmitted SRSs.

For example, in the example of FIG. 3, the hopping patterns 305 may depict a system bandwidth divided into eight portions, as indicated by the numerals 0-8 along the indicated frequency axis. The hopping patterns may also depict eight transmission intervals, as indicated by the numerals 0-8 along the indicated transmission interval axis, during which respective UEs 115 may transmit respective SRSs. For example, a first UE 115 may transmit a respective SRS 310 during the transmission intervals, a second UE 115 may transmit a respective SRS 315 during the transmission intervals, and a third UE 115 may transmit a respective SRS 320 during the transmission intervals. Other quantities of UEs 115 may be configured to transmit respective SRSs during the transmission intervals. For example, a fourth UE 115 may be configured to transmit a respective SRS 325 during the transmission intervals, although in the example of FIG. 3, the bandwidth spanned by the SRS 325 may be unused.

The SRSs may be communicated in accordance with frequency hopping indexes. For example, the SRSs of the hopping pattern 305-*a* may be communicated in accordance with frequency hopping indexes included in a hopping matrix $H_O$, and the SRSs of the hopping pattern 305-*b* may be communicated in accordance with a hopping matrix $H_S$, each of which are reproduced below:

$$H_O = \begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \end{bmatrix}; H_S = \begin{bmatrix} 1 & 0 & 0 & 1 & 0 & 1 & 1 & 0 \\ 1 & 0 & 1 & 0 & 1 & 0 & 1 & 0 \\ 1 & 1 & 0 & 1 & 1 & 0 & 0 & 0 \end{bmatrix}$$

Each row of the hopping matrices H may correspond to a respective set of frequency hopping indexes according to which a respective UE 115 may transmit SRSs. For example, the first row of frequency hopping indexes may be frequency hopping indexes according to which the first UE 115 transmits the respective SRSs 310, the second row of frequency hopping indexes may be frequency hopping indexes according to which the second transmits the respective SRSs 315, and so on. Each column of the hopping matrices H may correspond to a respective SRS transmission. For example, the first column of frequency hopping indexes may be the frequency hopping indexes according to which the UEs 115 may transmit respective SRSs during transmission interval 1, the second column of frequency hopping indexes may be the frequency hopping indexes according to which the UEs 115 transmit respective SRSs during transmission interval 2, and so on.

In some examples, each row of the hopping matrices H may correspond to a respective SRS transmission layer, which may be referred to as a layer. For example, a layer more correspond to a bandwidth spanned by an SRS transmitted at the layer. For instance, an SRS transmission may span $$\frac{1}{2^{layer\_idx}}$$

of the system bandwidth, where layer_idx corresponds to the layer index. Thus, a layer 1 SRS transmission may span ½ of the system bandwidth, a layer 2 SRS transmission may span a ¼ of the system bandwidth, a layer 3 transmission may span ⅛ of the system bandwidth, and so on. The first row of the hopping matrices H may correspond to layer 1 transmissions, the second row of the hopping matrices H may correspond to layer 2 transmissions, and so on. Accordingly, the SRSs 310 may span ½ the system bandwidth, the SRSs 315 may span ¼ of the system bandwidth, and the SRSs 320 may span ⅛ of the system bandwidth. In the example of FIG. 3, ⅛ of the system bandwidth represented by the SRS 325 may be unused during each transmission interval.

In some examples, the portion of the system bandwidth indicated by a respective frequency hopping index may be dependent on the frequency hopping indexes of lower layers. For example, in the example of FIG. 3, a frequency hopping index of 0 may indicate for the UE 115 to transmit the SRS in the lower portion of remaining system bandwidth (e.g., bandwidth unused by lower layer SRS transmissions), while a frequency hopping index may indicate for the UE 115 to transmit the SRS in the upper portion of the remaining system bandwidth.

For instance, the hopping matrix $H_O$ may indicate that, during the transmission interval 1, the first UE 115 is to transmit the SRS 310 in a lower portion of the remaining system bandwidth based on the corresponding frequency hopping index being a 0. Because none of the system bandwidth has been used by lower layer transmissions and the SRS 310 spans ½ the system bandwidth, the first UE 115 may transmit the SRS 310 during the transmission interval 1 via the lower ½ of the system bandwidth. Similarly, the hopping matrix $H_O$ may indicate that the second UE 115 is to transmit the SRS 315 in a lower portion of the system bandwidth remaining after the allocation of the SRS 310. Because the lower ½ of the system bandwidth is allocated for transmission of the SRS 310, the second UE 115 may transmit the SRS 315 during the transmission interval 1 via the lower ¼ of the upper ½ of the system bandwidth (e.g., spanning portions 4-6 of the system bandwidth). Similarly, the third UE 115 may transmit the SRS 320 during the transmission interval 1 via the lower ⅛ of the upper ¼ of the system bandwidth in accordance with the bandwidth allocations of the SRSs 310 and 315 and the corresponding frequency hopping index. In this way, respective portions of the bandwidths of the SRSs may be allocated in accordance with the frequency hopping indexes of the hopping matrices H.

In some cases, the hopping matrix $H_O$ may be generated based on an OVSF code. As a result, any device, including a malicious actor, may determine the hopping matrix $H_O$ and may therefore determine the resource allocations for a given SRS. In some examples, a malicious actor may use the determined resource allocation to jam a bandwidth for the given SRS, for example, by transmitting other signals via the same resources. The resulting collisions may reduce the reliability of the SRS transmission, which may prevent the network entity 105-*a* may obtaining the channel information, thereby resulting in denial of service. Alternatively, the malicious actor may measure the SRS via the determined resources to obtain the channel information, which may enable the device to obtain, for example, a CQI or pathloss information to determine whether the UE 115 that transmitted the SRS is nearby or far.

To reduce a likelihood that a malicious actor may determine SRS resource allocations, the UEs 115 and the network entity 105 may generate the hopping matrix $H_S$ (e.g., one or more rows of the hopping matrix $H_S$) using a key associated with. For example, the UEs 115 and the network entity 105 may use the key to pseudo-randomly generate the hopping matrix $H_S$ such that the hopping matrix $H_S$ is known to the UEs 115 and the network entity 105 and unknown to other devices. In some examples, the UEs 115 and the network entity 105 may use the key to generate bit vectors that indicate, for example, how to transform the hopping matrix $H_O$ into the hopping matrix $H_S$. Additional details related to the generation of the hopping matrix HS are described with reference to FIG. 4 below.

In some examples, the key used to generate the hopping matrix $H_S$ (e.g., the frequency hopping indexes of the hopping matrix $H_S$) may be common (e.g., known) to the network entity 105 and the UEs 115 that abide by the hopping pattern 305-*b*. For example, the network entity 105 and the UEs 115 (e.g., the first, second, and third UEs 115) may use the same key to generate the same hopping matrix $H_S$ to avoid collisions when communicating SRSs in accordance with securely generated frequency hopping indexes. In some examples, the key may be common to a cell via which the network entity 105 and the UEs 115 communicate or common to a group of UEs 115 associated with the cell (e.g., a group 210). That is, UEs 115 of the cell or the group may obtain the same key such that the SRSs may be communicated in accordance with the same hopping pattern 305 (e.g., hopping pattern 305-*b*). In some examples, the key being common to the cell or to a respective group of UEs 115 may be configured via RRC signaling, via a system information block (SIB), or a combination thereof.

In some examples, a rule may indicate that frequency hopping indexes generated in accordance with the OVSF code may be generated such that any $2^{layer\_idx}$ consecutive SRS transmissions may scan (e.g., together span) the system bandwidth. To support the secure generation of frequency hopping indexes using the key, the rule may be modified such that every disjoint subset of $2^{layer\_idx}$ consecutive SRS transmissions may scan the system bandwidth. A disjoint subset may correspond to the set of ($2^{layer\_idx}$ i+1, $2^{layer\_idx}$i+ 2, ..., $2^{layer\_idx}$ i+$2^{layer\_idx}$) consecutive SRS transmissions, for i=0, ... . $2^{N_{layers}}/2^{layer\_idx}$.

FIG. 4 illustrates an example of a process flow 400 that supports systems and techniques for secure SRS communication in accordance with one or more aspects of the present disclosure. The process flow 400 may be implemented by aspects of the wireless communications systems 100 or 200. For example, the process flow 400 may illustrate application of bit vectors 402 by a UE 115 or a network entity 105, which may be examples of corresponding devices described herein, including with reference to FIGS. 1 through 3, to securely generate frequency hopping indexes in association with SRS communication.

In the following description of the process flow 400, the operations may be performed in a different order than the order shown. Specific operations also may be left out of the process flow 400, or other operations may be added to the process flow 400. Further, although some operations or signaling may be shown to occur at different times for discussion purposes, these operations may actually occur at the same time.

At 405, the UE 115 or the network entity 105 may determine a hopping matrix 401-*a*, represented by the hopping matrix $H_O$ and reproduced below:

$$H_O = \begin{bmatrix} 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \end{bmatrix}$$

The hopping matrix $H_O$ may be an example of the hopping matrix $H_O$ described with reference to FIG. 3. For example, the UE 115 or the network entity 105 may determine the hopping matrix $H_O$ based on an OVSF code. It is noted the hopping matrix $H_O$ is an example hopping matrix determined based on an OVSF code and that other OVSF code-based hopping matrices are possible. Each row of the hopping matrix $H_O$ may correspond to a respective set of frequency hopping indexes according to which a respective UE 115 may transmit a set of SRSs, as described with reference to FIG. 3.

At 410, the UE 115 or the network entity 105 may apply a bit vector 402-*a*, represented by the bit vector $b_1$, to the hopping matrix $H_O$ to generate a hopping matrix 401-*b*, represented by the hopping matrix $H_1$. For example, each bit of the bit vector $b_1$ may indicate whether to swap a respective subset of frequency hopping indexes of a respective set of frequency hopping indexes (e.g., a respective row of the hopping matrix $H_O$). The bit vectors 402 may be applied sequentially (e.g., iteratively) to a hopping matrix H layer by layer to generate a secure hopping matrix (e.g., hopping matrix H). That is, a first bit vector 402 may be applied to layer 1 frequency hopping indexes (e.g., the first row of the hopping matrix), a second bit vector 402 may be applied to layer 2 frequency hopping indexes (e.g., the second row of the hopping matrix), and so on. Accordingly, the bit vector $b_1$ may be applied to the first row of the hopping matrix $H_O$ (e.g., the layer 1 frequency hopping indexes) to generate the hopping matrix $H_1$, reproduced below:

$$H_1 = \begin{bmatrix} 1 & 0 & 0 & 1 & 0 & 1 & 1 & 0 \\ 0 & 0 & 1 & 1 & 0 & 0 & 1 & 1 \\ 0 & 0 & 0 & 0 & 1 & 1 & 1 & 1 \end{bmatrix}$$

As stated, each bit of the bit vector $b_1$ may indicate whether to swap a respective subset of the layer 1 frequency hopping indexes. In the example of FIG. 4, the bit vector $b_1$=[1 0 0 1], where a '1' indicates for the UE 115 or the network entity 105 to swap a corresponding subset of frequency hopping indexes and a '0' indicates not to swap a corresponding subset of frequency hopping indexes. Each bit of the bit vector $b_1$ may correspond to two frequency hopping indexes of layer 1 frequency hopping indexes. In the example of FIG. 4, the first bit of the bit vector $b_1$ may correspond to the first and second layer 1 frequency hopping indexes (e.g., the first and second columns of the hopping matrix), the second bit of the bit vector $b_1$ may correspond to the third and fourth layer 1 frequency hopping indexes, and so on. Other correspondence between the bits of the bit vector $b_1$ and the layer 1 frequency hopping indexes are possible (e.g., each bit may correspond to a respective pair of '0' and '1' frequency hopping indexes). In accordance with the application of the bit vector $b_1$, the first and second layer 1 frequency hopping indexes and the seventh and eighth layer 1 frequency hopping indexes may be swapped, and the third and fourth layer 1 frequency hopping indexes and the fifth and sixth layer 1 frequency hopping indexes may not be swapped, resulting in the hopping matrix $H_1$ having a first row of [1 0 0 1 0 1 1 0].

At 415, the UE 115 or the network entity 105 may apply a bit vector 402-$b$, represented by the bit vector $b_2$, to the hopping matrix $H_1$ to generate a hopping matrix 401-$c$, represented by the hopping matrix $H_2$. For example, the bit vector $b_2$ may be applied to the second row of the hopping matrix $H_1$ (e.g., the layer 2 frequency hopping indexes) to generate the hopping matrix $H_2$, reproduced below:

$$H_2 = \begin{bmatrix} 1 & 0 & 0 & 1 & 0 & 1 & 1 & 0 \\ 1 & 0 & 1 & 0 & 1 & 0 & 1 & 0 \\ 0 & 0 & 0 & 0 & 1 & 1 & 1 & 1 \end{bmatrix}$$

Each bit of the bit vector $b_2$ may indicate whether to swap a respective subset of the layer 2 frequency hopping indexes. In the example of FIG. 4, the bit vector $b_2$=[1 0 1 0]. The correspondence of the bits of the bit vector $b_2$ to respective subsets of the layer 2 frequency hopping indexes may be based on the application of the bit vector $b_1$ to the layer 1 frequency hopping indexes. For example, the bits of the bit vector $b_2$ may indicate whether to swap layer 2 frequency hopping indexes within sets of '0' layer 1 frequency hopping indexes and sets of '1' layer 1 frequency hopping indexes. For instance, the first bit of the bit vector $b_2$ may indicate whether to swap layer 2 frequency hopping indexes within the columns of the first set of '0' or '1' layer 1 frequency hopping indexes, as represented by the bolding of in following reproduction of the bit vector $b_2$ and the hopping matrix $H_1$:

$$b_2 = [1 \quad 0 \quad 1 \quad 0]; H_1 = \begin{bmatrix} 1 & 0 & 0 & 1 & 0 & 1 & 1 & 0 \\ 0 & 0 & 1 & 1 & 0 & 0 & 1 & 1 \\ 0 & 0 & 0 & 0 & 1 & 1 & 1 & 1 \end{bmatrix}$$

$$b_2 = [1 \quad 0 \quad 1 \quad 0]; H_1 = \begin{bmatrix} 1 & 0 & 0 & 1 & 0 & 1 & 1 & 0 \\ 0 & 0 & 1 & 1 & 0 & 0 & 1 & 1 \\ 0 & 0 & 0 & 0 & 1 & 1 & 1 & 1 \end{bmatrix}$$

As depicted, the first bit of the bit vector $b_2$ may indicate to swap the layer 2 frequency hopping indexes in the first and fourth columns based on the first and fourth columns including the first set of '0' or '1' layer 1 frequency hopping indexes (e.g., '1' layer 1 frequency hopping indexes in the example of FIG. 4). Similarly, the second bit of the bit vector $b_2$ may indicate not to swap the layer 2 frequency hopping indexes in the second and third columns based on the second and third columns including the second set of '0' or '1' layer 1 frequency hopping indexes, and so on. Other correspondence between the bits of the bit vector $b_2$ and the layer 2 frequency hopping indexes are possible. For example, the first bit of the bit vector $b_2$ may correspond to the layer 2 frequency hopping indexes within the columns of the first set of '0' layer 1 frequency hopping indexes, the second bit of the bit vector may correspond to the layer 2 frequency hopping indexes within the columns of the first set of '1' layer 1 frequency hopping indexes, and so on, among other possibilities.

In accordance with the application of the bit vector $b_2$, the first and fourth layer 2 frequency hopping indexes and the fifth and eighth layer 2 frequency hopping indexes may be swapped, and the second and third layer 2 frequency hopping indexes and the sixth and seventh layer 2 frequency hopping indexes may not be swapped, resulting in the hopping matrix $H_2$ having a second row of [1 0 1 0 1 0 1 0].

At 420, the UE 115 or the network entity 105 may apply a bit vector 402-$c$, represented by the bit vector $b_3$, to the hopping matrix $H_2$ to generate a hopping matrix 401-$d$, represented by the hopping matrix $H_S$. For example, the bit vector $b_3$ may be applied to the third row of the hopping matrix $H_2$ (e.g., the layer 3 frequency hopping indexes) to generate the hopping matrix $H_S$, reproduced below:

$$H_s = \begin{bmatrix} 1 & 0 & 0 & 1 & 0 & 1 & 1 & 0 \\ 1 & 0 & 1 & 0 & 1 & 0 & 1 & 0 \\ 1 & 1 & 0 & 1 & 1 & 0 & 0 & 0 \end{bmatrix}$$

Each bit of the bit vector $b_3$ may indicate whether to swap a respective subset of the layer 3 frequency hopping indexes. In the example of FIG. 4, the bit vector $b_3$=[1 1 0 1]. The correspondence of the bits of the bit vector $b_3$ to respective subsets of the layer 3 frequency hopping indexes may be based on the application of the bit vectors $b_1$ and $b_2$. For example, the bits of the bit vector $b_3$ may indicate whether to swap layer 3 frequency hopping indexes within sets of tuples of layer 1 and layer 2 frequency hopping indexes, such as sets of $$\begin{bmatrix} 0 \\ 0 \end{bmatrix}, \begin{bmatrix} 1 \\ 0 \end{bmatrix}, \begin{bmatrix} 0 \\ 1 \end{bmatrix}, \text{and} \begin{bmatrix} 1 \\ 1 \end{bmatrix}$$

layer 1 and layer 2 frequency hopping index tuples. For instance, the first bit of the bit vector $b_2$ may indicate whether to swap layer 3 frequency hopping indexes within the columns of the set of $$\begin{bmatrix} 0 \\ 0 \end{bmatrix}$$

layer 1 and layer 2 frequency hopping index tuples, as represented by the bolding of in following reproduction of the bit vector $b_3$ and the hopping matrix $H_2$:

$$b_3 = [1 \quad 1 \quad 0 \quad 1]; H_2 = \begin{bmatrix} 1 & 0 & 0 & 1 & 0 & 1 & 1 & 0 \\ 1 & 0 & 1 & 0 & 1 & 0 & 1 & 0 \\ 0 & 0 & 0 & 0 & 1 & 1 & 1 & 1 \end{bmatrix}$$

$$b_3 = [1 \quad 1 \quad 0 \quad 1]; H_2 = \begin{bmatrix} 1 & 0 & 0 & 1 & 0 & 1 & 1 & 0 \\ 1 & 0 & 1 & 0 & 1 & 0 & 1 & 0 \\ 0 & 0 & 0 & 0 & 1 & 1 & 1 & 1 \end{bmatrix}$$

As depicted, the first bit of the bit vector $b_3$ may indicate to swap the layer 3 frequency hopping indexes in the second and eighth columns based on the second and eighth columns including the set of $$\begin{bmatrix} 0 \\ 0 \end{bmatrix}$$

layer 1 and layer 2 frequency hopping index tuples. Similarly, the second bit of the bit vector $b_3$ may indicate to swap the layer 3 frequency hopping indexes in the fourth and sixth columns based on the fourth and sixth columns including the set of $$\begin{bmatrix} 1 \\ 0 \end{bmatrix}$$

layer 1 and layer 2 frequency hopping index tuples, and so on. Other correspondence between the bits of the bit vector $b_3$ and the layer 3 frequency hopping indexes are possible. For example, any bit of the bit vector $b_3$ may correspond to the layer 3 frequency hopping indexes within the columns of any of the layer 1 and layer 2 frequency hopping index tuples.

In accordance with the application of the bit vector $b_3$, the second and eighth layer 3 frequency hopping indexes, the fourth and sixth layer 3 frequency hopping indexes, and the first and seventh layer 3 frequency hopping indexes may be swapped, and the third and fifth layer 3 frequency hopping indexes may not be swapped, resulting in the hopping matrix $H_S$ having a third row of [1 1 0 1 1 0 0 0].

In this way, the bit vectors 402 may be sequentially applied to pseudo-randomly generate the hopping matrix $H_S$. That is, devices that are able to determine the same set of bit vectors b for application to the hopping matrix $H_O$ may be able to determine the same hopping matrix $H_S$. In some examples, the bit vectors b may be generated using a key (e.g., a secret key, a secure key) shared by the network entity 105 and the UE 115. Thus, each of the network entity 105 and the UE 115 may individually generate the same hopping matrix $H_S$ and communicate SRSs in accordance with a corresponding set of frequency hopping indexes.

FIG. 5 illustrates an example of a bit generation diagram 500 that supports systems and techniques for secure SRS communication in accordance with one or more aspects of the present disclosure. The bit generation diagram 500 may be implemented by aspects of the wireless communications systems 100 or 200 described with reference to FIGS. 1 and 2. For example, the bit generation diagram 500 may by implemented by a UE 115 and a network entity 105, which may be examples of the corresponding devices described herein, including with reference to FIGS. 1 through 4, to support the communication of SRSs in accordance with securely generated frequency hopping indexes.

The bit generation diagram 500 may include a function 505 that may be utilized to generate one or more bit vectors 520, which may be examples of bit vectors 402 described with reference to FIG. 4. The function 505 may be a pseudo-random function that uses one or more inputs to generate the bit vectors 520 that may be applied to sets of frequency hopping indexes as described herein. That is, if different devices (e.g., network entities 105, UEs 115) each implement the function 505 and input the same information into the function 505, the function 505 will output the same set of bet vectors 520. However, different information input into the function 505 will result in different sets of bit vectors 520.

A network entity 105 or a UE 115 may input a key 510 into the function 505. The key 510 may be a key shared by (e.g., known to both) the network entity 105 and the UE 115 and used in association with the secure generation of frequency hopping indexes as described herein (e.g., a key obtained via a key message 225). In some examples, the network entity 105 or the UE 115 may input one or more additional inputs 515 into the function 505, such as an input 515-$a$ through an input 515-$n$. In some cases, the one or more additional inputs 515 may be a cell ID of a cell via which the UE 115 and the network entity 105 communicate, a time (e.g., a current time), a seed received from the network entity 105 (e.g., a binary sequence received from the network entity 105, an encrypted binary sequence received from the network entity 105), or a combination thereof. The function 505 may output the one or more bit vectors 520 based on the input of the key 510, the one or more inputs 515, or a combination thereof.

FIG. 6 illustrates an example of a communication diagram 600 that supports systems and techniques for secure SRS communication in accordance with one or more aspects of the present disclosure. The communication diagram 600 may be implemented by aspects of the wireless communications systems 100 or 200 described with reference to FIGS. 1 and 2. For example, the communication diagram 600 may by implemented by a UE 115 and a network entity 105, which may be examples of the corresponding devices described herein, including with reference to FIGS. 1 through 5, to support increased SRS communication security with respect to the time domain.

The communication diagram 600 may include mappings 605 that map indexes 610 to time parameters 615. In some examples, the time parameters 615 may be respective slot offsets that indicate an offset 630 from an initial slot of a TTI 620 associated with transmission of an SRS. For example, the slot offset 630 may be used to determine via which slot 625 of a TTI 620 that a UE 115 is to transmit the SRS. In some examples, the time parameters 615 may be respective periodicities 635 associated the transmission of SRSs. That is, each periodicity 635 may indicate how often that a UE 115 is to transmit an SRS. For example, a periodicity of 10 may indicate that the UE 115 is to transmit an SRS every 10 TTIs 620 (e.g., 10 subframes).

The mappings 605 may support the indication, by a network entity 105, of a particular time parameter according to which the UE 115 is to transmit SRSs. For example, the network entity 105 may transmit an index message (e.g., an index message 240) that indicates a particular index 610. The UE 115 may determine the time parameter 615 corresponding to the indicated index 610 and transmit one or more SRSs to the network entity 105 in accordance with the determined time parameter.

In some examples, a mapping 605 between indexes 610 and time parameters 615 may be deterministic (e.g., defined). The network entity 105 and the UE 115 may support the pseudo-randomization of the mapping 605 such that each index 610 may be mapped to a new time parameter 615. For example, the network entity 105 and the UE 115 may use a key (e.g., a key obtained via key message 225 or another control message) to generate a mapping 605-$a$ between the indexes 610 and the time parameters 615. For example, indexes 3, 4, 6, 1, 2, 8, 5, 7 may be mapped to time parameters A, B, C, D, E, F, G, H, respectively. In some examples, the network entity 105 and the UE 115 may input the key (e.g., and one or more other inputs) into a pseudo-random function (e.g., a function 505) to generate the mapping 605-$a$.

The network entity 105 may transmit a control message (e.g., a control message 235) to the UE 115 that includes an index 610, and the UE 115 may transmit one or more SRSs to the network entity 105 in accordance with the time parameter 615 mapped to the index 610 by the mapping 605-$a$. For example, the UE 115 may determine an offset 630-$a$ corresponding to the indicated index 610 and transmit one or more SRSs in a slot 625-$a$ of one or more TTIs 620. Additionally or alternatively, the UE 115 may determine a periodicity 635-$a$ and transmit SRSs, for example, via TTIs 620-$c$-1 and 620-$c$-2 (e.g., and so on) in accordance with the periodicity 635-$a$.

In some examples, the network entity 105 may transmit a control message (e.g., a control message 235) to indicate whether the UE 115 is to generate a mapping 605 using the key or, for example, to use a deterministic mapping 605. For example, the network entity 105 may transmit a control message that indicates for the UE 115 to generate the mapping 605-*a* using the key. In some examples, the control message may activate the generation of mappings 605 using the key in accordance with SRS communications. In some cases, another control message may deactivate the generation of mappings 605 using the key.

In some examples, the UE 115 and the network entity 105 may periodically generate new mappings 605 using the key (e.g., or another key, such as a refreshed key). For example, the mapping 605-*a* may be applied for a first period of time and may be refreshed after a quantity of TTIs 620 (e.g., a quantity of slots, a quantity of subframes). For instance, the UE 115 and the network entity 105 may use the mapping 605-*a* in association with communication of SRSs over a set of TTIs 620-*a* or a set of TTIs 620-*c*. The UE 115 and the network entity 105 may generate a new mapping 605 (e.g., a mapping 605-*b*) of the indexes 610 to the time parameters 615 to use in association with the communication of SRSs over a second period of time (e.g., a set of TTIs 620-*b*, a set of TTIs 620-*d*).

For example, the network entity 105 may transmit a second control message that indicates a second index 610, and the UE 115 may transmit one or more SRSs to the network entity 105 in accordance with the time parameter 615 mapped to the index 610 by the mapping 605-*b*. For instance, the UE 115 may determine an offset 630-*b* corresponding to the indicated index 610 and transmit one or more SRSs in a slot 625-*b* of one or more TTIs 620 of the set of TTIs 620-*b*. Additionally or alternatively, the UE 115 may determine a periodicity 635-*b* and transmit SRSs, for example, via TTIs 620-*d*-1 and 620-*d*-2 (e.g., and so on) in accordance with the periodicity 635-*b*.

FIG. 7 illustrates a block diagram 700 of a device 705 that supports systems and techniques for secure SRS communication in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to systems and techniques for secure SRS communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to systems and techniques for secure SRS communication). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of systems and techniques for secure SRS communication as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving a control message indicating a key associated with transmission of a set of SRSs via a system bandwidth for communicating with a network entity. The communications manager 720 may be configured as or otherwise support a means for generating, using the key, a set of frequency hopping indexes corresponding to the set of SRSs, each frequency hopping index of the set of frequency hopping indexes indicating a respective portion of the system bandwidth for transmission of a corresponding SRS. The communications manager 720 may be configured as or otherwise support a means for transmitting the set of SRSs via the respective portions of the system bandwidth in accordance with the set of frequency hopping indexes.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for secure SRS communications, which may reduce the likelihood of denial or service attacks or information extraction by a malicious actor. As a result, SRS communication reliability may be increased, which may support more accurate channel measurement and communication improvements (e.g., more efficient utilization of communication resources, more efficient power usage, etc.) based on improving channel measurement accuracy, among other benefits.

FIG. 8 illustrates a block diagram 800 of a device 805 that supports systems and techniques for secure SRS communication in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to systems and techniques for secure SRS communication). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to systems and techniques for secure SRS communication). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of systems and techniques for secure SRS communication as described herein. For example, the communications manager 820 may include a key component 825, a hopping index component 830, an SRS component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The key component 825 may be configured as or otherwise support a means for receiving a control message indicating a key associated with transmission of a set of SRSs via a system bandwidth for communicating with a network entity. The hopping index component 830 may be configured as or otherwise support a means for generating, using the key, a set of frequency hopping indexes corresponding to the set of SRSs, each frequency hopping index of the set of frequency hopping indexes indicating a respective portion of the system bandwidth for transmission of a corresponding SRS. The SRS component 835 may be configured as or otherwise support a means for transmitting the set of SRSs via the respective portions of the system bandwidth in accordance with the set of frequency hopping indexes.

FIG. 9 illustrates a block diagram 900 of a communications manager 920 that supports systems and techniques for secure SRS communication in accordance with one or more aspects of the present disclosure. The communications manager 920 may be an example of aspects of a communications manager 720, a communications manager 820, or both, as described herein. The communications manager 920, or various components thereof, may be an example of means for performing various aspects of systems and techniques for secure SRS communication as described herein. For example, the communications manager 920 may include a key component 925, a hopping index component 930, an SRS component 935, a control component 940, a slot offset component 945, an index component 950, a periodicity component 955, or any combination thereof. Each of these components may communicate, directly or indirectly, with one another (e.g., via one or more buses).

The communications manager 920 may support wireless communication at a UE in accordance with examples as disclosed herein. The key component 925 may be configured as or otherwise support a means for receiving a control message indicating a key associated with transmission of a set of SRSs via a system bandwidth for communicating with a network entity. The hopping index component 930 may be configured as or otherwise support a means for generating, using the key, a set of frequency hopping indexes corresponding to the set of SRSs, each frequency hopping index of the set of frequency hopping indexes indicating a respective portion of the system bandwidth for transmission of a corresponding SRS. The SRS component 935 may be configured as or otherwise support a means for transmitting the set of SRSs via the respective portions of the system bandwidth in accordance with the set of frequency hopping indexes.

In some examples, to support receiving the control message indicating the key, the key component 925 may be configured as or otherwise support a means for receiving a binary sequence encrypted via an encryption key shared by the UE and the network entity. In some examples, to support receiving the control message indicating the key, the key component 925 may be configured as or otherwise support a means for decrypting the binary sequence using the encryption key, where the binary sequence is the key.

In some examples, to support receiving the control message indicating the key, the key component 925 may be configured as or otherwise support a means for receiving one or more encryption keys based on a secure registration of the UE to a network, each encryption key of the one or more encryption keys corresponding to a respective cell, where the key is an encryption key corresponding to a cell via which the UE and the network entity communicate.

In some examples, to support receiving the control message indicating the key, the key component 925 may be configured as or otherwise support a means for receiving the control message based on an authentication of the UE within a group of UEs associated with a cell via which the UE and the network entity communicate, where the key is common to the group of UEs.

In some examples, the control message indicating the key is received from a second UE of the group of UEs based on the authentication of the UE within the group of UEs.

In some examples, to support generating the set of frequency hopping indexes, the hopping index component 930 may be configured as or otherwise support a means for generating, using the key, one or more vectors of bits, each bit of a vector of bits indicating whether to swap a respective subset of frequency hopping indexes of a respective set of frequency hopping indexes. In some examples, to support generating the set of frequency hopping indexes, the hopping index component 930 may be configured as or otherwise support a means for applying the one or more vectors of bits to a second set of frequency hopping indexes to generate the set of frequency hopping indexes.

In some examples, the hopping index component 930 may be configured as or otherwise support a means for determining the second set of frequency hopping indexes based on an OVSF code, where the one or more vectors of bits are applied to the second set of frequency hopping indexes based on the determination.

In some examples, the hopping index component 930 may be configured as or otherwise support a means for determining the respective subset of frequency hopping indexes to which a bit of the vector of bits corresponds based on a third set of frequency hopping indexes generated using the key.

In some examples, to support generating the one or more vectors of bits, the hopping index component 930 may be configured as or otherwise support a means for inputting the key and one or more additional inputs into a pseudo-random function that outputs the one or more vectors of bits, the one or more additional inputs including a cell ID of a cell via which the UE and the network entity communicate, a time, a seed received from the network entity, or a combination thereof.

In some examples, the control component 940 may be configured as or otherwise support a means for receiving, from the network entity, a second control message indicating for the UE to generate the set of frequency hopping indexes using the key in association with the transmission of the set of SRSs.

In some examples, the slot offset component 945 may be configured as or otherwise support a means for generating, using the key or a second key received from the network entity, a mapping between a set of slot offsets and a set of indexes corresponding to the set of slot offsets, each slot offset of the set of slot offsets indicating an offset from an initial slot of a TTI associated with transmission of a respective SRS. In some examples, the index component 950 may be configured as or otherwise support a means for receiving, from the network entity, a second control message indicating a first index of the set of indexes corresponding to a first slot offset of the set of slot offsets based on the mapping, where at least a subset of the set of SRSs are transmitted via respective TTIs in accordance with the first slot offset.

In some examples, the slot offset component 945 may be configured as or otherwise support a means for generating, using the key or the second key, a second mapping between the set of slot offsets and the set of indexes, where the second mapping is different than the mapping. In some examples, the index component 950 may be configured as or otherwise support a means for receiving, from the network entity a third control message indicating a second index of the set of indexes corresponding to a second slot offset of the set of slot offsets based on the second mapping, where a second subset of the set of SRSs are transmitted via respective TTIs in accordance with the second slot offset.

In some examples, the control component 940 may be configured as or otherwise support a means for receiving, from the network entity, a third control message indicating for the UE to generate the mapping using the key or the second key in association with the transmission of the set of SRSs.

In some examples, the periodicity component 955 may be configured as or otherwise support a means for generating, using the key or a second key received from the network entity, a mapping between a set of periodicities associated with the transmission of the set of SRSs and a set of indexes corresponding to the set of periodicities. In some examples, the index component 950 may be configured as or otherwise support a means for receiving, from the network entity, a second control message indicating a first index of the set of indexes corresponding to a first periodicity of the set of periodicities based on the mapping, where at least a subset of the set of SRSs are transmitted via respective TTIs in accordance with the first periodicity.

In some examples, the periodicity component 955 may be configured as or otherwise support a means for generating, using the key or the second key, a second mapping between the set of periodicities and the set of indexes, where the second mapping is different than the mapping. In some examples, the index component 950 may be configured as or otherwise support a means for receiving, from the network entity a third control message indicating a second index of the set of indexes corresponding to a second periodicity of the set of periodicities based on the second mapping, where a second subset of the set of SRSs are transmitted via respective TTIs in accordance with the second periodicity.

In some examples, the control component 940 may be configured as or otherwise support a means for receiving, from the network entity, a third control message indicating for the UE to generate the mapping using the key or the second key in association with the transmission of the set of SRSs.

In some examples, the key is common to a cell via which the UE and the network entity communicate or common to a respective group of UEs associated with the cell that includes the UE.

FIG. 10 illustrates a diagram of a system 1000 including a device 1005 that supports systems and techniques for secure SRS communication in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WIN-DOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting systems and techniques for secure SRS communication). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a control message indicating a key associated with transmission of a set of SRSs via a system bandwidth for communicating with a network entity. The communications manager 1020 may be configured as or otherwise support a means for generating, using the key, a set of frequency hopping indexes corresponding to the set of SRSs, each frequency hopping index of the set of frequency hopping indexes indicating a respective portion of the system bandwidth for transmission of a corresponding SRS. The communications manager 1020 may be configured as or otherwise support a means for transmitting the set of SRSs via the respective portions of the system bandwidth in accordance with the set of frequency hopping indexes.

By including or configuring the communications manager 1020 in accordance with examples as described herein, the device 1005 may support techniques for secure SRS communication, improved communication reliability, reduced likelihood of successful denial of service attacks or information extraction, more efficient utilization of communication resources, and improved coordination between devices, among other benefits.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of systems and techniques for secure SRS communication as described herein, or the processor 1040 and the memory 1030 may be otherwise configured to perform or support such operations.

FIG. 11 illustrates a block diagram 1100 of a device 1105 that supports systems and techniques for secure SRS communication in accordance with one or more aspects of the present disclosure. The device 1105 may be an example of aspects of a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The communications manager 1120, the receiver 1110, the transmitter 1115, or various combinations thereof or various components thereof may be examples of means for performing various aspects of systems and techniques for secure SRS communication as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1120 may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a network entity in accordance with examples as disclosed herein. For example, the communications manager 1120 may be configured as or otherwise support a means for outputting a control message indicating a key associated with communication of a set of SRSs via respective portions of a system bandwidth for communicating with a UE. The communications manager 1120 may be configured as or otherwise support a means for generating, using the key, a set of frequency hopping indexes corresponding to the set of SRSs, each frequency hopping index of the set of frequency hopping indexes indicating a respective portion of the system bandwidth for communication of a corresponding SRS. The communications manager 1120 may be configured as or otherwise support a means for obtaining the set of SRSs via the respective portions of the system bandwidth in accordance with the set of frequency hopping indexes.

By including or configuring the communications manager 1120 in accordance with examples as described herein, the device 1105 (e.g., a processor controlling or otherwise coupled with the receiver 1110, the transmitter 1115, the communications manager 1120, or a combination thereof) may support techniques for secure SRS communications, which may reduce the likelihood of denial or service attacks or information extraction by a malicious actor. As a result, SRS communication reliability may be increased, which may support more accurate channel measurement and communication improvements (e.g., more efficient utilization of communication resources, more efficient power usage, etc.) based on improving channel measurement accuracy, among other benefits.

FIG. 12 illustrates a block diagram 1200 of a device 1205 that supports systems and techniques for secure SRS communication in accordance with one or more aspects of the present disclosure. The device 1205 may be an example of aspects of a device 1105 or a network entity 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1205. In some examples, the receiver 1210 may support obtaining information by receiving signals via one or more antennas. Additionally, or alternatively, the receiver 1210 may support obtaining information by receiving signals via one or more wired (e.g., electrical, fiber optic) interfaces, wireless interfaces, or any combination thereof.

The transmitter 1215 may provide a means for outputting (e.g., transmitting, providing, conveying, sending) information generated by other components of the device 1205. For example, the transmitter 1215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1215 may support outputting information by transmitting signals via one or more antennas. Additionally, or alternatively, the transmitter 1215 may support outputting information by transmitting signals via one or more wired (e.g., electrical, fiber optic) interfaces, wireless interfaces, or any combination thereof. In some examples, the transmitter 1215 and the receiver 1210 may be co-located in a transceiver, which may include or be coupled with a modem.

The device 1205, or various components thereof, may be an example of means for performing various aspects of systems and techniques for secure SRS communication as described herein. For example, the communications manager 1220 may include a key component 1225, a hopping index component 1230, an SRS component 1235, or any combination thereof. The communications manager 1220 may be an example of aspects of a communications manager 1120 as described herein. In some examples, the communications manager 1220, or various components thereof, may be configured to perform various operations (e.g., receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations as described herein.

The communications manager 1220 may support wireless communication at a network entity in accordance with examples as disclosed herein. The key component 1225 may be configured as or otherwise support a means for outputting a control message indicating a key associated with communication of a set of SRSs via respective portions of a system bandwidth for communicating with a UE. The hopping index component 1230 may be configured as or otherwise support a means for generating, using the key, a set of frequency hopping indexes corresponding to the set of SRSs, each frequency hopping index of the set of frequency hopping indexes indicating a respective portion of the system bandwidth for communication of a corresponding SRS. The SRS component 1235 may be configured as or otherwise support a means for obtaining the set of SRSs via the respective portions of the system bandwidth in accordance with the set of frequency hopping indexes.

FIG. 13 illustrates a block diagram 1300 of a communications manager 1320 that supports systems and techniques for secure SRS communication in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of systems and techniques for secure SRS communication as described herein. For example, the communications manager 1320 may include a key component 1325, a hopping index component 1330, an SRS component 1335, a control component 1340, a slot offset component 1345, an index component 1350, a periodicity component 1355, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1320 may support wireless communication at a network entity in accordance with examples as disclosed herein. The key component 1325 may be configured as or otherwise support a means for outputting a control message indicating a key associated with communication of a set of SRSs via respective portions of a system bandwidth for communicating with a UE. The hopping index component 1330 may be configured as or otherwise support a means for generating, using the key, a set of frequency hopping indexes corresponding to the set of SRSs, each frequency hopping index of the set of frequency hopping indexes indicating a respective portion of the system bandwidth for communication of a corresponding SRS. The SRS component 1335 may be configured as or otherwise support a means for obtaining the set of SRSs via the respective portions of the system bandwidth in accordance with the set of frequency hopping indexes.

In some examples, to support outputting the control message indicating the key, the key component 1325 may be configured as or otherwise support a means for outputting a binary sequence encrypted via an encryption key shared by the UE and the network entity, where the binary sequence is the key.

In some examples, to support outputting the control message indicating the key, the key component 1325 may be configured as or otherwise support a means for outputting one or more encryption keys based on a secure registration of the UE with the network entity, each encryption key of the one or more encryption keys corresponding to a respective cell, where the key is an encryption key corresponding to a cell via which the UE and the network entity communicate.

In some examples, to support outputting the control message indicating the key, the key component 1325 may be configured as or otherwise support a means for outputting the control message based on an authentication of the UE within a group of UEs associated with a cell via which the UE and the network entity communicate, where the key is common to the group of UEs.

In some examples, to support generating the set of frequency hopping indexes, the hopping index component 1330 may be configured as or otherwise support a means for generating, using the key, one or more vectors of bits, each bit of a vector of bits indicating whether to swap a respective subset of frequency hopping indexes of a respective set of frequency hopping indexes. In some examples, to support generating the set of frequency hopping indexes, the hopping index component 1330 may be configured as or otherwise support a means for applying the one or more vectors of bits to a second set of frequency hopping indexes to generate the set of frequency hopping indexes.

In some examples, the hopping index component 1330 may be configured as or otherwise support a means for determining the second set of frequency hopping indexes based on an OVSF code, where the one or more vectors of bits are applied to the second set of frequency hopping indexes based on the determination.

In some examples, the hopping index component 1330 may be configured as or otherwise support a means for determining the respective subset of frequency hopping indexes to which a bit of the vector of bits corresponds based on a third set of frequency hopping indexes generated using the key.

In some examples, to support generating the one or more vectors of bits, the hopping index component 1330 may be configured as or otherwise support a means for inputting the key and one or more additional inputs into a pseudo-random function that outputs the one or more vectors of bits, the one or more additional inputs including a cell ID of a cell via which the UE and the network entity communicate, a time, a seed generated by the network entity, or a combination thereof.

In some examples, the control component 1340 may be configured as or otherwise support a means for outputting a second control message indicating for the UE to generate the set of frequency hopping indexes using the key in association with the communication of the set of SRSs, where the set of frequency hopping indexes are generated by the network entity based on the second control message.

In some examples, the slot offset component 1345 may be configured as or otherwise support a means for generating, using the key or a second key, a mapping between a set of slot offsets and a set of indexes corresponding to the set of slot offsets, each slot offset of the set of slot offsets indicating an offset from an initial slot of a TTI associated with communication of a respective SRS. In some examples, the index component 1350 may be configured as or otherwise support a means for outputting a second control message indicating a first index of the set of indexes corresponding to a first slot offset of the set of slot offsets based on the mapping, where at least a subset of the set of SRSs are obtained via respective TTIs in accordance with the first slot offset.

In some examples, the slot offset component 1345 may be configured as or otherwise support a means for generating, using the key or the second key, a second mapping between the set of slot offsets and the set of indexes, where the second mapping is different than the mapping. In some examples, the index component 1350 may be configured as or otherwise support a means for outputting a third control message indicating a second index of the set of indexes corresponding to a second slot offset of the set of slot offsets based on the second mapping, where a second subset of the set of SRSs are obtained via respective TTIs in accordance with the second slot offset.

In some examples, the control component 1340 may be configured as or otherwise support a means for outputting a third control message indicating for the UE to generate the mapping using the key or the second key in association with the communication of the set of SRSs, where the mapping is generated by the network entity based on the third control message.

In some examples, the periodicity component 1355 may be configured as or otherwise support a means for generating, using the key or a second key, a mapping between a set of periodicities associated with the communication of the set of SRSs and a set of indexes corresponding to the set of periodicities. In some examples, the index component 1350 may be configured as or otherwise support a means for outputting a second control message indicating a first index of the set of indexes corresponding to a first periodicity of the set of periodicities based on the mapping, where at least a subset of the set of SRSs are obtained via respective TTIs in accordance with the first periodicity.

In some examples, the periodicity component 1355 may be configured as or otherwise support a means for generating, using the key or the second key, a second mapping between the set of periodicities and the set of indexes, where the second mapping is different than the mapping. In some examples, the index component 1350 may be configured as or otherwise support a means for outputting a third control message indicating a second index of the set of indexes corresponding to a second periodicity of the set of periodicities based on the second mapping, where a second subset of the set of SRSs are obtained via respective TTIs in accordance with the second periodicity.

In some examples, the control component 1340 may be configured as or otherwise support a means for outputting a third control message indicating for the UE to generate the mapping using the key or the second key in association with the communication of the set of SRSs, where the mapping is generated by the network entity based on the third control message.

In some examples, the key is common to a cell via which the UE and the network entity communicate or common to a respective group of UEs associated with the cell that includes the UE.

FIG. 14 illustrates a diagram of a system 1400 including a device 1405 that supports systems and techniques for secure SRS communication in accordance with one or more aspects of the present disclosure. The device 1405 may be an example of or include the components of a device 1105, a device 1205, or a network entity 105 as described herein. The device 1405 may communicate with one or more network entities 105, one or more UEs 115, or any combination thereof, which may include communications over one or more wired interfaces, over one or more wireless interfaces, or any combination thereof. The device 1405 may include components that support outputting and obtaining communications, such as a communications manager 1420, a transceiver 1410, an antenna 1415, a memory 1425, code 1430, and a processor 1435. These components may be in electronic communication or otherwise coupled (e.g., operatively, communicatively, functionally, electronically, electrically) via one or more buses (e.g., a bus 1440).

The transceiver 1410 may support bi-directional communications via wired links, wireless links, or both as described herein. In some examples, the transceiver 1410 may include a wired transceiver and may communicate bi-directionally with another wired transceiver. Additionally, or alternatively, in some examples, the transceiver 1410 may include a wireless transceiver and may communicate bi-directionally with another wireless transceiver. In some examples, the device 1405 may include one or more antennas 1415, which may be capable of transmitting or receiving wireless transmissions (e.g., concurrently). The transceiver 1410 may also include a modem to modulate signals, to provide the modulated signals for transmission (e.g., by one or more antennas 1415, by a wired transmitter), to receive modulated signals (e.g., from one or more antennas 1415, from a wired receiver), and to demodulate signals. In some implementations, the transceiver 1410 may include one or more interfaces, such as one or more interfaces coupled with the one or more antennas 1415 that are configured to support various receiving or obtaining operations, or one or more interfaces coupled with the one or more antennas 1415 that are configured to support various transmitting or outputting operations, or a combination thereof. In some implementations, the transceiver 1410 may include or be configured for coupling with one or more processors or memory components that are operable to perform or support operations based on received or obtained information or signals, or to generate information or other signals for transmission or other outputting, or any combination thereof. In some implementations, the transceiver 1410, or the transceiver 1410 and the one or more antennas 1415, or the transceiver 1410 and the one or more antennas 1415 and one or more processors or memory components (for example, the processor 1435, or the memory 1425, or both), may be included in a chip or chip assembly that is installed in the device 1405. In some examples, the transceiver may be operable to support communications via one or more communications links (e.g., a communication link 125, a backhaul communication link 120, a midhaul communication link 162, a fronthaul communication link 168).

The memory 1425 may include RAM and ROM. The memory 1425 may store computer-readable, computer-executable code 1430 including instructions that, when executed by the processor 1435, cause the device 1405 to perform various functions described herein. The code 1430 may be stored in a non-transitory computer-readable medium such as system memory or another type of memory. In some cases, the code 1430 may not be directly executable by the processor 1435 but may cause a computer (e.g., when compiled and executed) to perform functions described herein. In some cases, the memory 1425 may contain, among other things, a BIOS which may control basic hardware or software operation such as the interaction with peripheral components or devices.

The processor 1435 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1435 may be configured to operate a memory array using a memory controller. In some other cases, a memory controller may be integrated into the processor 1435. The processor 1435 may be configured to execute computer-readable instructions stored in a memory (e.g., the memory 1425) to cause the device 1405 to perform various functions (e.g., functions or tasks supporting systems and techniques for secure SRS communication). For example, the device 1405 or a component of the device 1405 may include a processor 1435 and memory 1425 coupled with the processor 1435, the processor 1435 and memory 1425 configured to perform various functions described herein. The processor 1435 may be an example of a cloud-computing platform (e.g., one or more physical nodes and supporting software such as operating systems, virtual machines, or container instances) that may host the functions (e.g., by executing code 1430) to perform the functions of the device 1405. The processor 1435 may be any one or more suitable processors capable of executing scripts or instructions of one or more software programs stored in the device 1405 (such as within the memory 1425). In some implementations, the processor 1435 may be a component of a processing system. A processing system may generally refer to a system or series of machines or components that receives inputs and processes the inputs to produce a set of outputs (which may be passed to other systems or components of, for example, the device 1405). For example, a processing system of the device 1405 may refer to a system including the various other components or subcomponents of the device 1405, such as the processor 1435, or the transceiver 1410, or the communications manager 1420, or other components or combinations of components of the device 1405. The processing system of the device 1405 may interface with other components of the device 1405, and may process information received from other components (such as inputs or signals) or output information to other components. For example, a chip or modem of the device 1405 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1405 may transmit information output from the chip or modem. Additionally, or alternatively, in some implementations, the one or more interfaces may refer to an interface between the processing system of the chip or modem and a receiver, such that the device 1405 may obtain information or signal inputs, and the information may be passed to the processing system.

A person having ordinary skill in the art will readily recognize that a first interface also may obtain information or signal inputs, and a second interface also may output information or signal outputs.

In some examples, a bus 1440 may support communications of (e.g., within) a protocol layer of a protocol stack. In some examples, a bus 1440 may support communications associated with a logical channel of a protocol stack (e.g., between protocol layers of a protocol stack), which may include communications performed within a component of the device 1405, or between different components of the device 1405 that may be co-located or located in different locations (e.g., where the device 1405 may refer to a system in which one or more of the communications manager 1420, the transceiver 1410, the memory 1425, the code 1430, and the processor 1435 may be located in one of the different components or divided between different components).

In some examples, the communications manager 1420 may manage aspects of communications with a core network 130 (e.g., via one or more wired or wireless backhaul links). For example, the communications manager 1420 may manage the transfer of data communications for client devices, such as one or more UEs 115. In some examples, the communications manager 1420 may manage communications with other network entities 105, and may include a controller or scheduler for controlling communications with UEs 115 in cooperation with other network entities 105. In some examples, the communications manager 1420 may support an X2 interface within an LTE/LTE-A wireless communications network technology to provide communication between network entities 105.

The communications manager 1420 may support wireless communication at a network entity in accordance with examples as disclosed herein. For example, the communications manager 1420 may be configured as or otherwise support a means for outputting a control message indicating a key associated with communication of a set of SRSs via respective portions of a system bandwidth for communicating with a UE. The communications manager 1420 may be configured as or otherwise support a means for generating, using the key, a set of frequency hopping indexes corresponding to the set of SRSs, each frequency hopping index of the set of frequency hopping indexes indicating a respective portion of the system bandwidth for communication of a corresponding SRS. The communications manager 1420 may be configured as or otherwise support a means for obtaining the set of SRSs via the respective portions of the system bandwidth in accordance with the set of frequency hopping indexes.

By including or configuring the communications manager 1420 in accordance with examples as described herein, the device 1405 may support techniques for secure SRS communication, improved communication reliability, reduced likelihood of successful denial of service attacks or information extraction, more efficient utilization of communication resources, and improved coordination between devices, among other benefits.

In some examples, the communications manager 1420 may be configured to perform various operations (e.g., receiving, obtaining, monitoring, outputting, transmitting) using or otherwise in cooperation with the transceiver 1410, the one or more antennas 1415 (e.g., where applicable), or any combination thereof. Although the communications manager 1420 is illustrated as a separate component, in some examples, one or more functions described with reference to the communications manager 1420 may be supported by or performed by the transceiver 1410, the processor 1435, the memory 1425, the code 1430, or any combination thereof. For example, the code 1430 may include instructions executable by the processor 1435 to cause the device 1405 to perform various aspects of systems and techniques for secure SRS communication as described herein, or the processor 1435 and the memory 1425 may be otherwise configured to perform or support such operations.

FIG. 15 illustrates a flowchart illustrating a method 1500 that supports systems and techniques for secure SRS communication in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include receiving a control message indicating a key associated with transmission of a set of SRSs via a system bandwidth for communicating with a network entity. The operations of 1505 may be performed in accordance with examples as disclosed herein. In some examples, aspects of the operations of 1505 may be performed by a key component 925 as described with reference to FIG. 9.

At 1510, the method may include generating, using the key, a set of frequency hopping indexes corresponding to the set of SRSs, each frequency hopping index of the set of frequency hopping indexes indicating a respective portion of the system bandwidth for transmission of a corresponding SRS. The operations of 1510 may be performed in accordance with examples as disclosed herein. In some examples, aspects of the operations of 1510 may be performed by a hopping index component 930 as described with reference to FIG. 9.

At 1515, the method may include transmitting the set of SRSs via the respective portions of the system bandwidth in accordance with the set of frequency hopping indexes. The operations of 1515 may be performed in accordance with examples as disclosed herein. In some examples, aspects of the operations of 1515 may be performed by an SRS component 935 as described with reference to FIG. 9.

Figure 16:
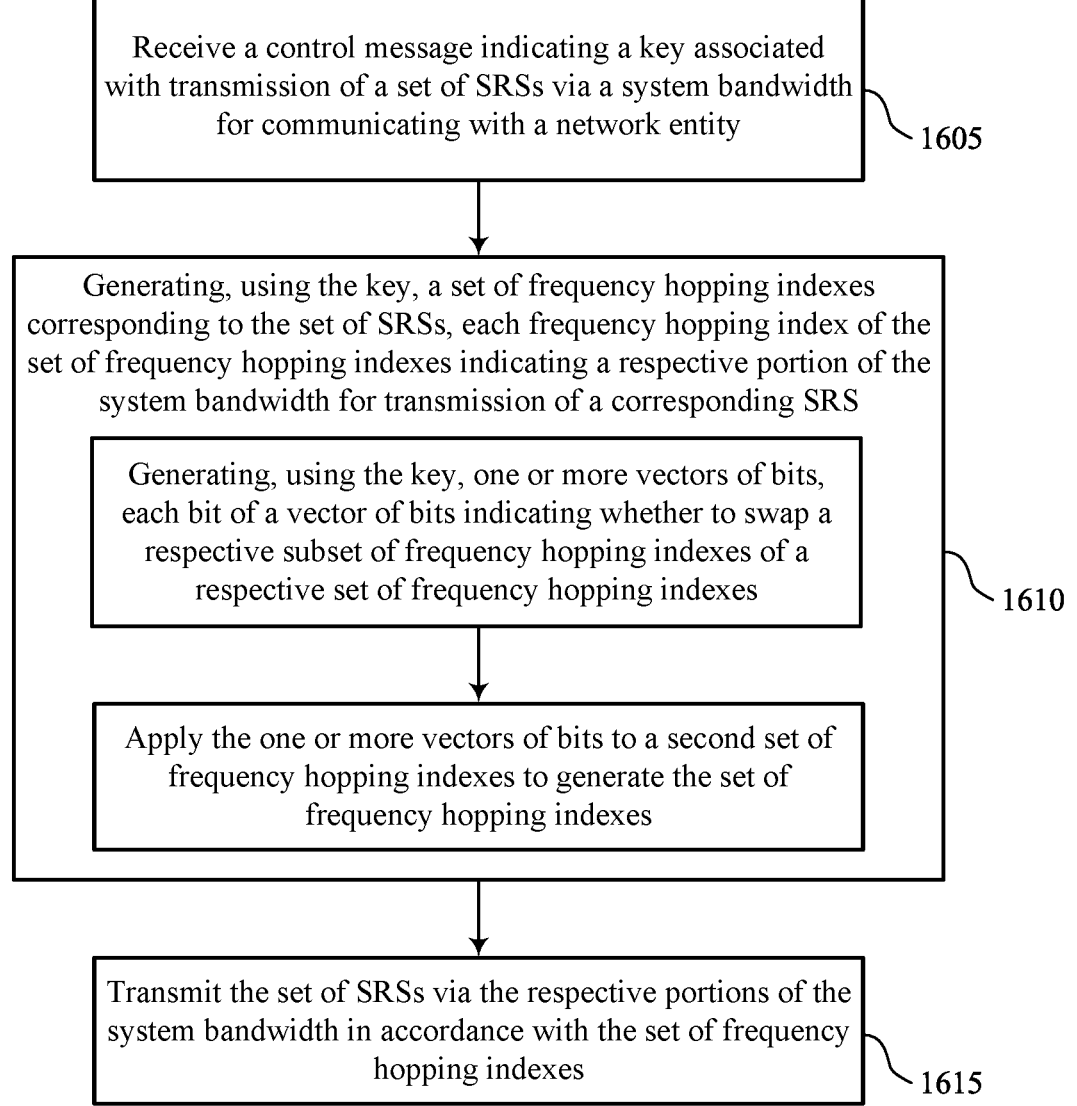

FIG. 16 illustrates a flowchart illustrating a method 1600 that supports systems and techniques for secure SRS communication in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving a control message indicating a key associated with transmission of a set of SRSs via a system bandwidth for communicating with a network entity. The operations of 1605 may be performed in accordance with examples as disclosed herein. In some examples, aspects of the operations of 1605 may be performed by a key component 925 as described with reference to FIG. 9.

At 1610, the method may include generating, using the key, a set of frequency hopping indexes corresponding to the set of SRSs, each frequency hopping index of the set of frequency hopping indexes indicating a respective portion of the system bandwidth for transmission of a corresponding SRS. In some examples, generating the set of frequency hopping indexes may include generating, using the key, one or more vectors of bits, each bit of a vector of bits indicating whether to swap a respective subset of frequency hopping indexes of a respective set of frequency hopping indexes. In some examples, generating the set of frequency hopping indexes may include applying the one or more vectors of bits to a second set of frequency hopping indexes to generate the set of frequency hopping indexes. The operations of 1610 may be performed in accordance with examples as disclosed herein. In some examples, aspects of the operations of 1610 may be performed by a hopping index component 930 as described with reference to FIG. 9.

At 1615, the method may include transmitting the set of SRSs via the respective portions of the system bandwidth in accordance with the set of frequency hopping indexes. The operations of 1615 may be performed in accordance with examples as disclosed herein. In some examples, aspects of the operations of 1615 may be performed by an SRS component 935 as described with reference to FIG. 9.

FIG. 17 illustrates a flowchart illustrating a method 1700 that supports systems and techniques for secure SRS communication in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include receiving a control message indicating a key associated with transmission of a set of SRSs via a system bandwidth for communicating with a network entity. The operations of 1705 may be performed in accordance with examples as disclosed herein. In some examples, aspects of the operations of 1705 may be performed by a key component 925 as described with reference to FIG. 9.

At 1710, the method may include receiving, from the network entity, a second control message indicating for the UE to generate a set of frequency hopping indexes using the key in association with the transmission of the set of SRSs. The operations of 1710 may be performed in accordance with examples as disclosed herein. In some examples, aspects of the operations of 1710 may be performed by a control component 940 as described with reference to FIG. 9.

At 1715, the method may include generating, using the key, the set of frequency hopping indexes corresponding to the set of SRSs, each frequency hopping index of the set of frequency hopping indexes indicating a respective portion of the system bandwidth for transmission of a corresponding SRS. The operations of 1715 may be performed in accordance with examples as disclosed herein. In some examples, aspects of the operations of 1715 may be performed by a hopping index component 930 as described with reference to FIG. 9.

At 1720, the method may include transmitting the set of SRSs via the respective portions of the system bandwidth in accordance with the set of frequency hopping indexes. The operations of 1720 may be performed in accordance with examples as disclosed herein. In some examples, aspects of the operations of 1720 may be performed by an SRS component 935 as described with reference to FIG. 9.

FIG. 18 illustrates a flowchart illustrating a method 1800 that supports systems and techniques for secure SRS communication in accordance with one or more aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include outputting a control message indicating a key associated with communication of a set of SRSs via respective portions of a system bandwidth for communicating with a UE. The operations of 1805 may be performed in accordance with examples as disclosed herein. In some examples, aspects of the operations of 1805 may be performed by a key component 1325 as described with reference to FIG. 13.

At 1810, the method may include generating, using the key, a set of frequency hopping indexes corresponding to the set of SRSs, each frequency hopping index of the set of frequency hopping indexes indicating a respective portion of the system bandwidth for communication of a corresponding SRS. The operations of 1810 may be performed in accordance with examples as disclosed herein. In some examples, aspects of the operations of 1810 may be performed by a hopping index component 1330 as described with reference to FIG. 13.

At 1815, the method may include obtaining the set of SRSs via the respective portions of the system bandwidth in accordance with the set of frequency hopping indexes. The operations of 1815 may be performed in accordance with examples as disclosed herein. In some examples, aspects of the operations of 1815 may be performed by an SRS component 1335 as described with reference to FIG. 13.

FIG. 19 illustrates a flowchart illustrating a method 1900 that supports systems and techniques for secure SRS communication in accordance with one or more aspects of the present disclosure. The operations of the method 1900 may be implemented by a network entity or its components as described herein. For example, the operations of the method 1900 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1905, the method may include outputting a control message indicating a key associated with communication of a set of SRSs via respective portions of a system bandwidth for communicating with a UE. The operations of 1905 may be performed in accordance with examples as disclosed herein. In some examples, aspects of the operations of 1905 may be performed by a key component 1325 as described with reference to FIG. 13.

At 1910, the method may include generating, using the key, a set of frequency hopping indexes corresponding to the set of SRSs, each frequency hopping index of the set of frequency hopping indexes indicating a respective portion of the system bandwidth for communication of a corresponding SRS. In some examples, generating the set of frequency hopping indexes may include generating, using the key, one or more vectors of bits, each bit of a vector of bits indicating whether to swap a respective subset of frequency hopping indexes of a respective set of frequency hopping indexes. In some examples, generating the set of frequency hopping indexes may include applying the one or more vectors of bits to a second set of frequency hopping indexes to generate the set of frequency hopping indexes. The operations of 1910 may be performed in accordance with examples as disclosed herein. In some examples, aspects of the operations of 1910 may be performed by a hopping index component 1330 as described with reference to FIG. 13.

At 1915, the method may include obtaining the set of SRSs via the respective portions of the system bandwidth in accordance with the set of frequency hopping indexes. The operations of 1915 may be performed in accordance with examples as disclosed herein. In some examples, aspects of the operations of 1915 may be performed by an SRS component 1335 as described with reference to FIG. 13.

FIG. 20 illustrates a flowchart illustrating a method 2000 that supports systems and techniques for secure SRS communication in accordance with one or more aspects of the present disclosure. The operations of the method 2000 may be implemented by a network entity or its components as described herein. For example, the operations of the method 2000 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 2005, the method may include outputting a control message indicating a key associated with communication of a set of SRSs via respective portions of a system bandwidth for communicating with a UE. The operations of 2005 may be performed in accordance with examples as disclosed herein. In some examples, aspects of the operations of 2005 may be performed by a key component 1325 as described with reference to FIG. 13.

At 2010, the method may include outputting a second control message indicating for the UE to generate a set of frequency hopping indexes using the key in association with the communication of the set of SRSs. The operations of 2010 may be performed in accordance with examples as disclosed herein. In some examples, aspects of the operations of 2010 may be performed by a control component 1340 as described with reference to FIG. 13.

At 2015, the method may include generating, using the key, the set of frequency hopping indexes corresponding to the set of SRSs, each frequency hopping index of the set of frequency hopping indexes indicating a respective portion of the system bandwidth for communication of a corresponding SRS, where the set of frequency hopping indexes are generated by the network entity based on the second control message. The operations of 2015 may be performed in accordance with examples as disclosed herein. In some examples, aspects of the operations of 2015 may be performed by a hopping index component 1330 as described with reference to FIG. 13.

At 2020, the method may include obtaining the set of SRSs via the respective portions of the system bandwidth in accordance with the set of frequency hopping indexes. The operations of 2020 may be performed in accordance with examples as disclosed herein. In some examples, aspects of the operations of 2020 may be performed by an SRS component 1335 as described with reference to FIG. 13.

The following provides an overview of aspects of the present disclosure:

Aspect 1: A method for wireless communication at a UE, comprising: receiving a control message indicating a key associated with transmission of a set of SRSs via a system bandwidth for communicating with a network entity; generating, using the key, a set of frequency hopping indexes corresponding to the set of SRSs, each frequency hopping index of the set of frequency hopping indexes indicating a respective portion of the system bandwidth for transmission of a corresponding SRS; and transmitting the set of SRSs via the respective portions of the system bandwidth in accordance with the set of frequency hopping indexes.

Aspect 2: The method of aspect 1, wherein receiving the control message indicating the key comprises: receiving a binary sequence encrypted via an encryption key shared by the UE and the network entity; and decrypting the binary sequence using the encryption key, wherein the binary sequence is the key.

Aspect 3: The method of aspect 1, wherein receiving the control message indicating the key comprises: receiving one or more encryption keys based at least in part on a secure registration of the UE to a network, each encryption key of the one or more encryption keys corresponding to a respective cell, wherein the key is an encryption key corresponding to a cell via which the UE and the network entity communicate.

Aspect 4: The method of aspect 1, wherein receiving the control message indicating the key comprises: receiving the control message based at least in part on an authentication of the UE within a group of UEs associated with a cell via which the UE and the network entity communicate, wherein the key is common to the group of UEs.

Aspect 5: The method of aspect 4, wherein the control message indicating the key is received from a second UE of the group of UEs based at least in part on the authentication of the UE within the group of UEs.

Aspect 6: The method of any of aspects 1 through 5, wherein generating the set of frequency hopping indexes comprises: generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes.

Aspect 7: The method of aspect 6, further comprising: determining the second set of frequency hopping indexes based at least in part on an OVSF code, wherein the one or more vectors of bits are applied to the second set of frequency hopping indexes based at least in part on the determination.

Aspect 8: The method of any of aspects 6 through 7, further comprising: determining the respective subset of frequency hopping indexes to which a bit of the vector of bits corresponds based at least in part on a third set of frequency hopping indexes generated using the key.

Aspect 9: The method of any of aspects 6 through 8, wherein generating the one or more vectors of bits comprises: inputting the key and one or more additional inputs into a pseudo-random function that outputs the one or more vectors of bits, the one or more additional inputs comprising a cell ID of a cell via which the UE and the network entity communicate, a time, a seed received from the network entity, or a combination thereof.

Aspect 10: The method of any of aspects 1 through 9, further comprising: receiving, from the network entity, a second control message indicating for the UE to generate the set of frequency hopping indexes using the key in association with the transmission of the set of SRSs.

Aspect 11: The method of any of aspects 1 through 10, further comprising: generating, using the key or a second key received from the network entity, a mapping between a set of slot offsets and a set of indexes corresponding to the set of slot offsets, each slot offset of the set of slot offsets indicating an offset from an initial slot of a TTI associated with transmission of a respective SRS; and receiving, from the network entity, a second control message indicating a first index of the set of indexes corresponding to a first slot offset of the set of slot offsets based at least in part on the mapping, wherein at least a subset of the set of SRSs are transmitted via respective TTIs in accordance with the first slot offset.

Aspect 12: The method of aspect 11, further comprising: generating, using the key or the second key, a second mapping between the set of slot offsets and the set of indexes, wherein the second mapping is different than the mapping; and receiving, from the network entity a third control message indicating a second index of the set of indexes corresponding to a second slot offset of the set of slot offsets based at least in part on the second mapping, wherein a second subset of the set of SRSs are transmitted via respective TTIs in accordance with the second slot offset.

Aspect 13: The method of any of aspects 11 through 12, further comprising: receiving, from the network entity, a third control message indicating for the UE to generate the mapping using the key or the second key in association with the transmission of the set of SRSs.

Aspect 14: The method of any of aspects 1 through 13, further comprising: generating, using the key or a second key received from the network entity, a mapping between a set of periodicities associated with the transmission of the set of SRSs and a set of indexes corresponding to the set of periodicities; and receiving, from the network entity, a second control message indicating a first index of the set of indexes corresponding to a first periodicity of the set of periodicities based at least in part on the mapping, wherein at least a subset of the set of SRSs are transmitted via respective TTIs in accordance with the first periodicity.

Aspect 15: The method of aspect 14, further comprising: generating, using the key or the second key, a second mapping between the set of periodicities and the set of indexes, wherein the second mapping is different than the mapping; and receiving, from the network entity a third control message indicating a second index of the set of indexes corresponding to a second periodicity of the set of periodicities based at least in part on the second mapping, wherein a second subset of the set of SRSs are transmitted via respective TTIs in accordance with the second periodicity.

Aspect 16: The method of any of aspects 14 through 15, further comprising: receiving, from the network entity, a third control message indicating for the UE to generate the mapping using the key or the second key in association with the transmission of the set of SRSs.

Aspect 17: The method of any of aspects 1 through 16, wherein the key is common to a cell via which the UE and the network entity communicate or common to a respective group of UEs associated with the cell that comprises the UE.

Aspect 18: A method for wireless communication at a network entity, comprising: outputting a control message indicating a key associated with communication of a set of SRSs via respective portions of a system bandwidth for communicating with a UE; generating, using the key, a set of frequency hopping indexes corresponding to the set of SRSs, each frequency hopping index of the set of frequency hopping indexes indicating a respective portion of the system bandwidth for communication of a corresponding SRS; and obtaining the set of SRSs via the respective portions of the system bandwidth in accordance with the set of frequency hopping indexes.

Aspect 19: The method of aspect 18, wherein outputting the control message indicating the key comprises: outputting a binary sequence encrypted via an encryption key shared by the UE and the network entity, wherein the binary sequence is the key.

Aspect 20: The method of aspect 18, wherein outputting the control message indicating the key comprises: outputting one or more encryption keys based at least in part on a secure registration of the UE with the network entity, each encryption key of the one or more encryption keys corresponding to a respective cell, wherein the key is an encryption key corresponding to a cell via which the UE and the network entity communicate.

Aspect 21: The method of aspect 18, wherein outputting the control message indicating the key comprises: outputting the control message based at least in part on an authentication of the UE within a group of UEs associated with a cell via which the UE and the network entity communicate, wherein the key is common to the group of UEs.

Aspect 22: The method of any of aspects 18 through 21, wherein generating the set of frequency hopping indexes comprises: generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes.

Aspect 23: The method of aspect 22, further comprising: determining the second set of frequency hopping indexes based at least in part on an OVSF code, wherein the one or more vectors of bits are applied to the second set of frequency hopping indexes based at least in part on the determination.

Aspect 24: The method of any of aspects 22 through 23, further comprising: determining the respective subset of frequency hopping indexes to which a bit of the vector of bits corresponds based at least in part on a third set of frequency hopping indexes generated using the key.

Aspect 25: The method of any of aspects 22 through 24, wherein generating the one or more vectors of bits comprises: inputting the key and one or more additional inputs into a pseudo-random function that outputs the one or more vectors of bits, the one or more additional inputs comprising a cell ID of a cell via which the UE and the network entity communicate, a time, a seed generated by the network entity, or a combination thereof.

Aspect 26: The method of any of aspects 18 through 25, further comprising: outputting a second control message indicating for the UE to generate the set of frequency hopping indexes using the key in association with the communication of the set of SRSs, wherein the set of frequency hopping indexes are generated by the network entity based at least in part on the second control message.

Aspect 27: The method of any of aspects 18 through 26, further comprising: generating, using the key or a second key, a mapping between a set of slot offsets and a set of indexes corresponding to the set of slot offsets, each slot offset of the set of slot offsets indicating an offset from an initial slot of a TTI associated with communication of a respective SRS; and outputting a second control message indicating a first index of the set of indexes corresponding to a first slot offset of the set of slot offsets based at least in part on the mapping, wherein at least a subset of the set of SRSs are obtained via respective TTIs in accordance with the first slot offset.

Aspect 28: The method of aspect 27, further comprising: generating, using the key or the second key, a second mapping between the set of slot offsets and the set of indexes, wherein the second mapping is different than the mapping; and outputting a third control message indicating a second index of the set of indexes corresponding to a second slot offset of the set of slot offsets based at least in part on the second mapping, wherein a second subset of the set of SRSs are obtained via respective TTIs in accordance with the second slot offset.

Aspect 29: The method of any of aspects 27 through 28, further comprising: outputting a third control message indicating for the UE to generate the mapping using the key or the second key in association with the communication of the set of SRSs, wherein the mapping is generated by the network entity based at least in part on the third control message.

Aspect 30: The method of any of aspects 18 through 29, further comprising: generating, using the key or a second key, a mapping between a set of periodicities associated with the communication of the set of SRSs and a set of indexes corresponding to the set of periodicities; and outputting a second control message indicating a first index of the set of indexes corresponding to a first periodicity of the set of periodicities based at least in part on the mapping, wherein at least a subset of the set of SRSs are obtained via respective TTIs in accordance with the first periodicity.

Aspect 31: The method of aspect 30, further comprising: generating, using the key or the second key, a second mapping between the set of periodicities and the set of indexes, wherein the second mapping is different than the mapping; and outputting a third control message indicating a second index of the set of indexes corresponding to a second periodicity of the set of periodicities based at least in part on the second mapping, wherein a second subset of the set of SRSs are obtained via respective TTIs in accordance with the second periodicity.

Aspect 32: The method of any of aspects 30 through 31, further comprising: outputting a third control message indicating for the UE to generate the mapping using the key or the second key in association with the communication of the set of SRSs, wherein the mapping is generated by the network entity based at least in part on the third control message.

Aspect 33: The method of any of aspects 18 through 32, wherein the key is common to a cell via which the UE and the network entity communicate or common to a respective group of UEs associated with the cell that comprises the UE.

Aspect 34: An apparatus for wireless communication at a UE, comprising a processor; memory coupled with the processor; and instructions stored in the memory and executable by the processor to cause the apparatus to perform a method of any of aspects 1 through 17.

Aspect 35: An apparatus for wireless communication at a UE, comprising at least one means for performing a method of any of aspects 1 through 17.

Aspect 36: A non-transitory computer-readable medium storing code for wireless communication at a UE, the code comprising instructions executable by a processor to perform a method of any of aspects 1 through 17.

Aspect 37: An apparatus for wireless communication at a network entity, comprising a processor; memory coupled with the processor; and instructions stored in the memory and executable by the processor to cause the apparatus to perform a method of any of aspects 18 through 33.

Aspect 38: An apparatus for wireless communication at a network entity, comprising at least one means for performing a method of any of aspects 18 through 33.

Aspect 39: A non-transitory computer-readable medium storing code for wireless communication at a network entity, the code comprising instructions executable by a processor to perform a method of any of aspects 18 through 33.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

receiving a control message indicating a key associated with transmission of a set of sounding reference signals via a system bandwidth for communicating with a network entity;

generating, using the key, a set of frequency hopping indexes corresponding to the set of sounding reference signals, each frequency hopping index of the set of frequency hopping indexes indicating a respective portion of the system bandwidth for transmission of a corresponding sounding reference signal, wherein generating the set of frequency hopping indexes comprise:

generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes; and transmitting the set of sounding reference signals via the respective portions of the system bandwidth in accordance with the set of frequency hopping indexes.

2. The method of claim 1, wherein receiving the control message indicating the key comprises:

receiving a binary sequence encrypted via an encryption key shared by the UE and the network entity; and decrypting the binary sequence using the encryption key, wherein the binary sequence is the key.

3. The method of claim 1, wherein receiving the control message indicating the key comprises:

receiving one or more encryption keys based at least in part on a secure registration of the UE to a network, each encryption key of the one or more encryption keys corresponding to a respective cell, wherein the key is an encryption key corresponding to a cell via which the UE and the network entity communicate.

4. The method of claim 1, wherein receiving the control message indicating the key comprises:

receiving the control message based at least in part on an authentication of the UE within a group of UEs associated with a cell via which the UE and the network entity communicate, wherein the key is common to the group of UEs.

5. The method of claim 4, wherein the control message indicating the key is received from a second UE of the group of UEs based at least in part on the authentication of the UE within the group of UEs.

6. The method of claim 1, further comprising:

determining the second set of frequency hopping indexes based at least in part on an orthogonal variable spreading factor code, wherein the one or more vectors of bits are applied to the second set of frequency hopping indexes based at least in part on the determination.

7. The method of claim 1, further comprising:

determining the respective subset of frequency hopping indexes to which a bit of the vector of bits corresponds based at least in part on a third set of frequency hopping indexes generated using the key.

8. The method of claim 1, wherein generating the one or more vectors of bits comprises:

inputting the key and one or more additional inputs into a pseudo-random function that outputs the one or more vectors of bits, the one or more additional inputs comprising a cell identifier of a cell via which the UE and the network entity communicate, a time, a seed received from the network entity, or a combination thereof.

9. The method of claim 1, further comprising:

receiving, from the network entity, a second control message indicating for the UE to generate the set of frequency hopping indexes using the key in association with the transmission of the set of sounding reference signals.

10. The method of claim 1, further comprising:

generating, using the key or a second key received from the network entity, a mapping between a set of slot offsets and a set of indexes corresponding to the set of slot offsets, each slot offset of the set of slot offsets indicating an offset from an initial slot of a transmission time interval associated with transmission of a respective sounding reference signal; and receiving, from the network entity, a second control message indicating a first index of the set of indexes corresponding to a first slot offset of the set of slot offsets based at least in part on the mapping, wherein at least a subset of the set of sounding reference signals are transmitted via respective transmission time intervals in accordance with the first slot offset.

11. The method of claim 10, further comprising:

generating, using the key or the second key, a second mapping between the set of slot offsets and the set of indexes, wherein the second mapping is different than the mapping; and receiving, from the network entity a third control message indicating a second index of the set of indexes corresponding to a second slot offset of the set of slot offsets based at least in part on the second mapping, wherein a second subset of the set of sounding reference signals are transmitted via respective transmission time intervals in accordance with the second slot offset.

12. The method of claim 10, further comprising:

receiving, from the network entity, a third control message indicating for the UE to generate the mapping using the key or the second key in association with the transmission of the set of sounding reference signals.

13. The method of claim 1, further comprising:

generating, using the key or a second key received from the network entity, a mapping between a set of periodicities associated with the transmission of the set of sounding reference signals and a set of indexes corresponding to the set of periodicities; and receiving, from the network entity, a second control message indicating a first index of the set of indexes corresponding to a first periodicity of the set of periodicities based at least in part on the mapping, wherein at least a subset of the set of sounding reference signals are transmitted via respective transmission time intervals in accordance with the first periodicity.

14. The method of claim 13, further comprising:

generating, using the key or the second key, a second mapping between the set of periodicities and the set of indexes, wherein the second mapping is different than the mapping; and receiving, from the network entity a third control message indicating a second index of the set of indexes corresponding to a second periodicity of the set of periodicities based at least in part on the second mapping, wherein a second subset of the set of sounding reference signals are transmitted via respective transmission time intervals in accordance with the second periodicity.

15. The method of claim 13, further comprising:

receiving, from the network entity, a third control message indicating for the UE to generate the mapping using the key or the second key in association with the transmission of the set of sounding reference signals.

16. The method of claim 1, wherein the key is common to a cell via which the UE and the network entity communicate or common to a respective group of UEs associated with the cell that comprises the UE.

17. A method for wireless communication at a network entity, comprising:

outputting a control message indicating a key associated with communication of a set of sounding reference signals via respective portions of a system bandwidth for communicating with a user equipment (UE);

generating, using the key, a set of frequency hopping indexes corresponding to the set of sounding reference signals, each frequency hopping index of the set of frequency hopping indexes indicating a respective portion of the system bandwidth for communication of a corresponding sounding reference signal, wherein generating the set of frequency hopping indexes comprises:

generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes; and obtaining the set of sounding reference signals via the respective portions of the system bandwidth in accordance with the set of frequency hopping indexes.

18. The method of claim 17, wherein outputting the control message indicating the key comprises:

outputting a binary sequence encrypted via an encryption key shared by the UE and the network entity, wherein the binary sequence is the key.

19. The method of claim 17, wherein outputting the control message indicating the key comprises:

outputting one or more encryption keys based at least in part on a secure registration of the UE with the network entity, each encryption key of the one or more encryption keys corresponding to a respective cell, wherein the key is an encryption key corresponding to a cell via which the UE and the network entity communicate.

20. The method of claim 17, wherein outputting the control message indicating the key comprises:

outputting the control message based at least in part on an authentication of the UE within a group of UEs associated with a cell via which the UE and the network entity communicate, wherein the key is common to the group of UEs.

21. The method of claim 17, further comprising:

determining the second set of frequency hopping indexes based at least in part on a orthogonal variable spreading factor code, wherein the one or more vectors of bits are applied to the second set of frequency hopping indexes based at least in part on the determination.

22. The method of claim 17, further comprising:

determining the respective subset of frequency hopping indexes to which a bit of the vector of bits corresponds based at least in part on a third set of frequency hopping indexes generated using the key.

23. The method of claim 17, wherein generating the one or more vectors of bits comprises:

inputting the key and one or more additional inputs into a pseudo-random function that outputs the one or more vectors of bits, the one or more additional inputs comprising a cell identifier of a cell via which the UE and the network entity communicate, a time, a seed generated by the network entity, or a combination thereof.

24. The method of claim 17, further comprising:

outputting a second control message indicating for the UE to generate the set of frequency hopping indexes using the key in association with the communication of the set of sounding reference signals, wherein the set of frequency hopping indexes are generated by the network entity based at least in part on the second control message.

25. The method of claim 17, further comprising:

generating, using the key or a second key, a mapping between a set of slot offsets and a set of indexes corresponding to the set of slot offsets, each slot offset of the set of slot offsets indicating an offset from an initial slot of a transmission time interval associated with communication of a respective sounding reference signal; and outputting a second control message indicating a first index of the set of indexes corresponding to a first slot offset of the set of slot offsets based at least in part on the mapping, wherein at least a subset of the set of sounding reference signals are obtained via respective transmission time intervals in accordance with the first slot offset.

26. The method of claim 17, further comprising:

generating, using the key or a second key, a mapping between a set of periodicities associated with the communication of the set of sounding reference signals and a set of indexes corresponding to the set of periodicities; and outputting a second control message indicating a first index of the set of indexes corresponding to a first periodicity of the set of periodicities based at least in part on the mapping, wherein at least a subset of the set of sounding reference signals are obtained via respective transmission time intervals in accordance with the first periodicity.

27. An apparatus for wireless communication at a user equipment (UE), comprising:

a processor;

memory coupled with the processor; and instructions stored in the memory and executable by the processor to cause the apparatus to:

receive a control message indicating a key associated with transmission of a set of sounding reference signals via a system bandwidth for communicating with a network entity;

generating, used the key, a set of frequency hopping indexes corresponding to the set of sounding reference signals, each frequency hopping index of the set of frequency hopping indexes indicating a respective portion of the system bandwidth for transmission of a corresponding sounding reference signal, wherein generating the set of frequency hopping indexes comprise:

generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes; and transmit the set of sounding reference signals via the respective portions of the system bandwidth in accordance with the set of frequency hopping indexes.

28. An apparatus for wireless communication at a network entity, comprising:

a processor;

memory coupled with the processor; and instructions stored in the memory and executable by the processor to cause the apparatus to:

output a control message indicating a key associated with communication of a set of sounding reference signals via respective portions of a system bandwidth for communicating with a user equipment (UE);

generating, used the key, a set of frequency hopping indexes corresponding to the set of sounding reference signals, each frequency hopping index of the set of frequency hopping indexes indicating a respective portion of the system bandwidth for communication of a corresponding sounding reference signal, wherein generating the set of frequency hopping indexes comprises:

generating, using the key, one or more vectors of bits, each bit of a vector of bits indicating whether to swap a respective subset of frequency hopping indexes of a respective set of frequency hopping indexes; and applying the one or more vectors of bits to a second set of frequency hopping indexes to generate the set of frequency hopping indexes; and obtain the set of sounding reference signals via the respective portions of the system bandwidth in accordance with the set of frequency hopping indexes.

* * * * *